(12) United States Patent
Durbhakula

(10) Patent No.: US 12,229,054 B2
(45) Date of Patent: Feb. 18, 2025

(54) RECONFIGURABLE CACHES FOR IMPROVING PERFORMANCE OF GRAPHICS PROCESSING UNITS

(71) Applicant: QUALCOMM Incorporated, San Diego, CA (US)

(72) Inventor: Suryanarayana Murthy Durbhakula, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 186 days.

(21) Appl. No.: 18/194,505

(22) Filed: Mar. 31, 2023

(65) Prior Publication Data

US 2024/0330195 A1 Oct. 3, 2024

(51) Int. Cl.
*G06F 12/0897* (2016.01)
*G06F 12/0891* (2016.01)
*G06T 1/60* (2006.01)

(52) U.S. Cl.
CPC ...... *G06F 12/0897* (2013.01); *G06F 12/0891* (2013.01); *G06T 1/60* (2013.01)

(58) Field of Classification Search
CPC ............ G06F 12/0891; G06F 12/0897; G06F 12/0875; G06F 12/084; G06F 12/0811; G06F 2212/1024; G06F 2212/1016; G06F 12/0802; G06F 2212/60; G06F 2212/2515; G06F 12/0646; G06F 2209/508; G06F 2212/601; G06T 1/60

(Continued)

(56) References Cited

U.S. PATENT DOCUMENTS 6,205,537 B1 3/2001 Albonesi
2007/0094453 A1* 4/2007 Santhanakrishnan ......................
G06F 9/3851
712/E9.047

(Continued)

FOREIGN PATENT DOCUMENTS

WO 2021046217 A1 3/2021

OTHER PUBLICATIONS

International Search Report and Written Opinion—PCT/US2024/013655—ISA/EPO—Jun. 11, 2024.

*Primary Examiner* — Yaima Rigol
*Assistant Examiner* — Edward Waddy, Jr.
(74) *Attorney, Agent, or Firm* — QUALCOMM Incorporated

(57) ABSTRACT

Aspects presented herein relate to methods and devices for graphics processing units including an apparatus. The apparatus may calculate a first average memory latency for the first configuration of the cache. Further, the apparatus may adjust the first configuration of the cache to a second configuration of the cache. The apparatus may calculate a second average memory latency for second configuration of the cache. Further, the apparatus may adjust the second configuration to a third configuration of the cache. The apparatus may calculate a third average memory latency for third configuration of the cache. The apparatus may output an indication of a lowest average memory latency of the first average memory latency, the second average memory latency, or a third average memory latency. Also, the apparatus may set, based on the lowest average memory latency, the cache to the first configuration, the second configuration, or a third configuration.

30 Claims, 12 Drawing Sheets

(58) Field of Classification Search
USPC .............. 711/118, 144, 115, 123, 130, 167; 345/501
See application file for complete search history.

(56) References Cited

U.S. PATENT DOCUMENTS

| | | | |
|---|---|---|---|
| 2010/0005242 A1* | 1/2010 | Cantin | G06F 12/0893 |
| | | | 711/E12.017 |
| 2010/0281216 A1 | 11/2010 | Patel et al. | |
| 2014/0258618 A1* | 9/2014 | Novakovsky | G06F 12/0802 |
| | | | 711/118 |
| 2016/0117241 A1* | 4/2016 | Shah | G06F 12/0895 |
| | | | 711/119 |
| 2018/0129612 A1* | 5/2018 | Lewis | G06F 12/121 |
| 2020/0334163 A1* | 10/2020 | Shergill | G06F 11/3409 |
| 2021/0150663 A1* | 5/2021 | Maiyuran | G06F 12/0802 |

* cited by examiner

RECONFIGURABLE CACHES FOR IMPROVING PERFORMANCE OF GRAPHICS PROCESSING UNITS

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may monitor, during a first observation interval in a set of observation intervals, an average memory latency for a cache including a first configuration. Additionally, the apparatus may calculate, at an end of the first observation interval, a first average memory latency for the first configuration of the cache. The apparatus may also adjust, at a beginning of a second observation interval in the set of observation intervals, the first configuration of the cache to a second configuration of the cache. Moreover, the apparatus may transfer dirty data that is stored in the cache at the first configuration based on the adjustment of the first configuration of the cache to the second configuration of the cache. The apparatus may also calculate, at an end of the second observation interval, a second average memory latency for the second configuration of the cache. The apparatus may also adjust, at a beginning of a third observation interval in the set of observation intervals, the second configuration of the cache to a third configuration of the cache. The apparatus may also calculate, at an end of the third observation interval, a third average memory latency for the third configuration of the cache. The apparatus may also output an indication of a lowest average memory latency of the first average memory latency for the first configuration or the second average memory latency for the second configuration (or a third average memory latency for a third configuration). The apparatus may also set, based on the lowest average memory latency, the cache to the first configuration or the second configuration for at least one remaining observation interval in the set of observation intervals. The apparatus may also set, based on the lowest average memory latency, the cache to the first configuration, the second configuration, or the third configuration for at least one remaining observation interval in the set of observation intervals. The apparatus may also monitor, at an end of a last observation interval in the set of observation intervals, the average memory latency for the cache during a first subsequent observation interval in a set of subsequent observation intervals, where the set of subsequent observation intervals is subsequent to the set of observation intervals.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
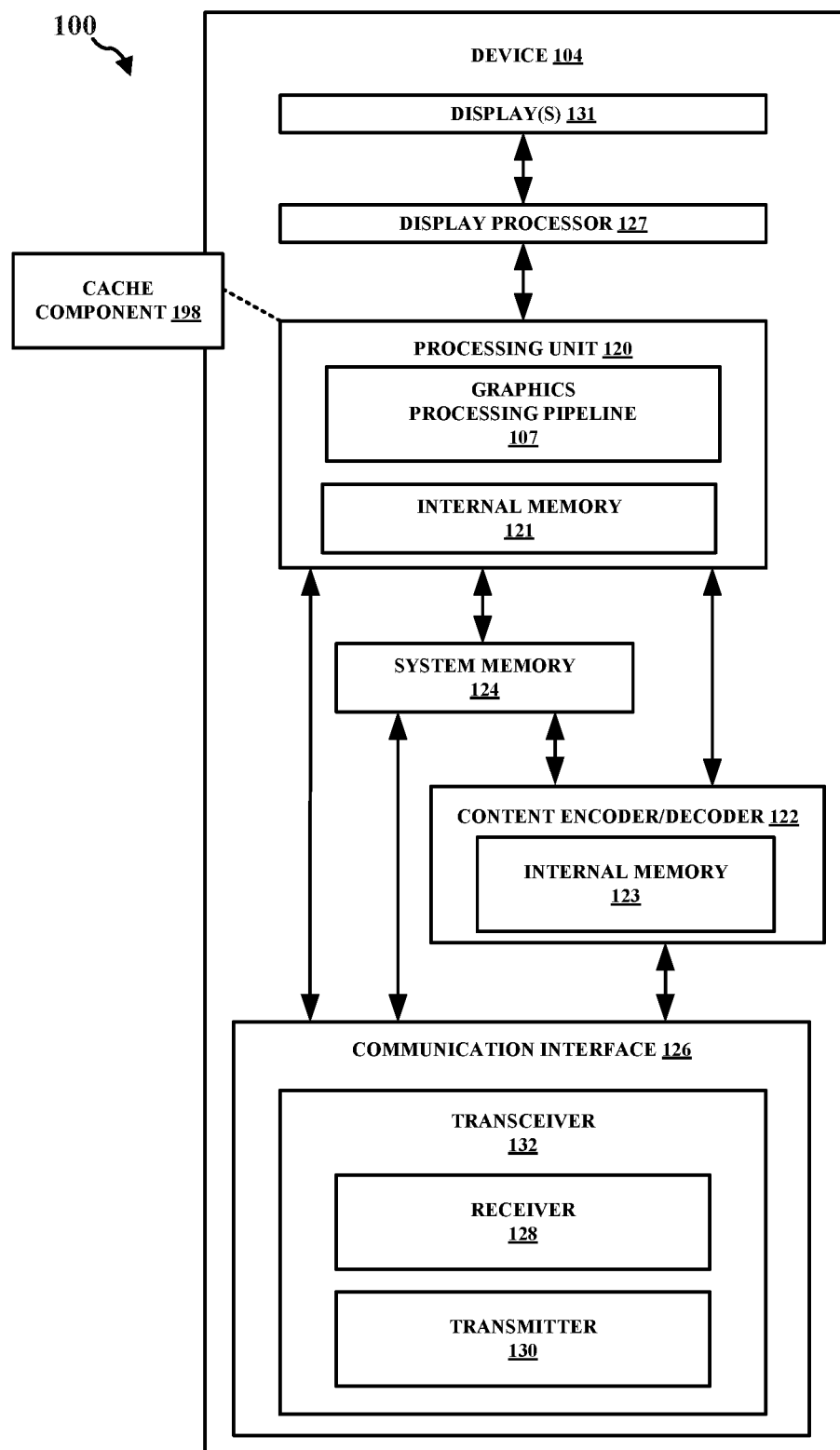
FIG. 1 is a block diagram that illustrates an example content generation system.

Caches may store and retrieve data from memory, so, in some instances, caches may experience memory latency. For instance, memory latency may be the time (i.e., latency) elapsed from an initial request for data until the data is actually retrieved. That is, memory latency may refer to time elapsed from an initiation of a request for a data (e.g., a byte or word) in memory until it is retrieved from the memory (e.g., retrieved from the memory by a processor). In comparison, memory latency measures a time elapsed to actually retrieve data from memory, while memory bandwidth measures a throughput of the memory. In some aspects, if the data is not in the memory or cache, it may take a longer period of time to obtain the data, thus resulting in an increased memory latency (e.g., the processor may have to communicate with external memory cells. For instance, memory latency may be a measure of the speed of the memory, such that a faster the reading operation will have a reduced memory latency and a slower the reading operation will have an increased memory latency.

Memory latency may be expressed in different measurements of time (e.g., in actual time elapsed (such as ns) or clock cycles). An average memory latency may refer to the average time elapsed from a request for data until the data is actually retrieved. The average memory latency may be calculated or determined based on an average of a number of data requests for a cache. In some aspects, a high average memory latency for a cache (i.e., higher than a threshold for an average memory latency) may negatively impact performance (e.g., performance at a GPU). Also, an optimized level (i.e., ideal level) of cache associativity may vary based on the type of application that is running (e.g., an application on a GPU or CPU), and the optimized level of cache associativity may vary at run-time (e.g., run-time of a GPU or CPU). That is, cache associativity may vary from application-to-application, and even within a single application, an ideal cache associativity may vary at run-time. In some instances, cache access patterns for GPUs may vary during run-time, and a GPU cache may have a high associativity. Moreover, depending on the application that is running on the GPU, a high associativity may not be needed, such that the ideal cache associativity may vary. Aspects of the present disclosure may utilize reconfigurable or adjustable caches. That is, aspects presented herein may adjust or reconfigure a configuration (e.g., data storage configuration) of caches in order to reduce or combat high average memory latency.

Aspects presented herein may include a number of benefits or advantages. For instance, aspects presented herein may adjust or reconfigure a configuration of caches in order to reduce or combat high average memory latency. Also, aspects presented herein may adjust or reconfigure an associativity of a cache and/or a number of cache sets of a cache. Aspects presented herein may adjust or reconfigure an organization of a cache associativity and/or an organization of a number of cache sets. Aspects presented herein may adjust the organization of cache associativity in order to account for a variance in cache associativity (e.g., based on a type of application running), as well as to combat a high average memory latency. For example, aspects presented herein may adjust a first configuration of a cache associativity to a second configuration of a cache associativity based on a type of application. Likewise, aspects presented herein may adjust a first configuration of a number of cache sets to a second configuration of a number of cache sets based on a type of application.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a cache component 198 configured to monitor, during a first observation interval in a set of observation intervals, an average memory latency for a cache including a first configuration. The cache component 198 may also be configured to calculate, at an end of the first observation interval, a first average memory latency for the first configuration of the cache. The cache component 198 may also be configured to adjust, at a beginning of a second observation interval in the set of observation intervals, the first configuration of the cache to a second configuration of the cache. The cache component 198 may also be configured to transfer dirty data that is stored in the cache at the first configuration based on the adjustment of the first configuration of the cache to the second configuration of the cache. The cache component 198 may also be configured to calculate, at an end of the second observation interval, a second average memory latency for the second configuration of the cache. The cache component 198 may also be configured to adjust, at a beginning of a third observation interval in the set of observation intervals, the second configuration of the cache to a third configuration of the cache. The cache component 198 may also be configured to calculate, at an end of the third observation interval, a third average memory latency for the third configuration of the cache. The cache component 198 may also be configured to output an indication of a lowest average memory latency of the first average memory latency for the first configuration or the second average memory latency for the second configuration (or a third average memory latency for a third configuration). The cache component 198 may also be configured to set, based on the lowest average memory latency, the cache to the first configuration or the second configuration for at least one remaining observation interval in the set of observation intervals. The cache component 198 may also be configured to set, based on the lowest average memory latency, the cache to the first configuration, the second configuration, or the third configuration for at least one remaining observation interval in the set of observation intervals. The cache component 198 may also be configured to monitor, at an end of a last observation interval in the set of observation intervals, the average memory latency for the cache during a first subsequent observation interval in a set of subsequent observation intervals, where the set of subsequent observation intervals is subsequent to the set of observation intervals. Although the following description may be focused on display processing, the concepts described herein may be applicable to other similar processing techniques. As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU. Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
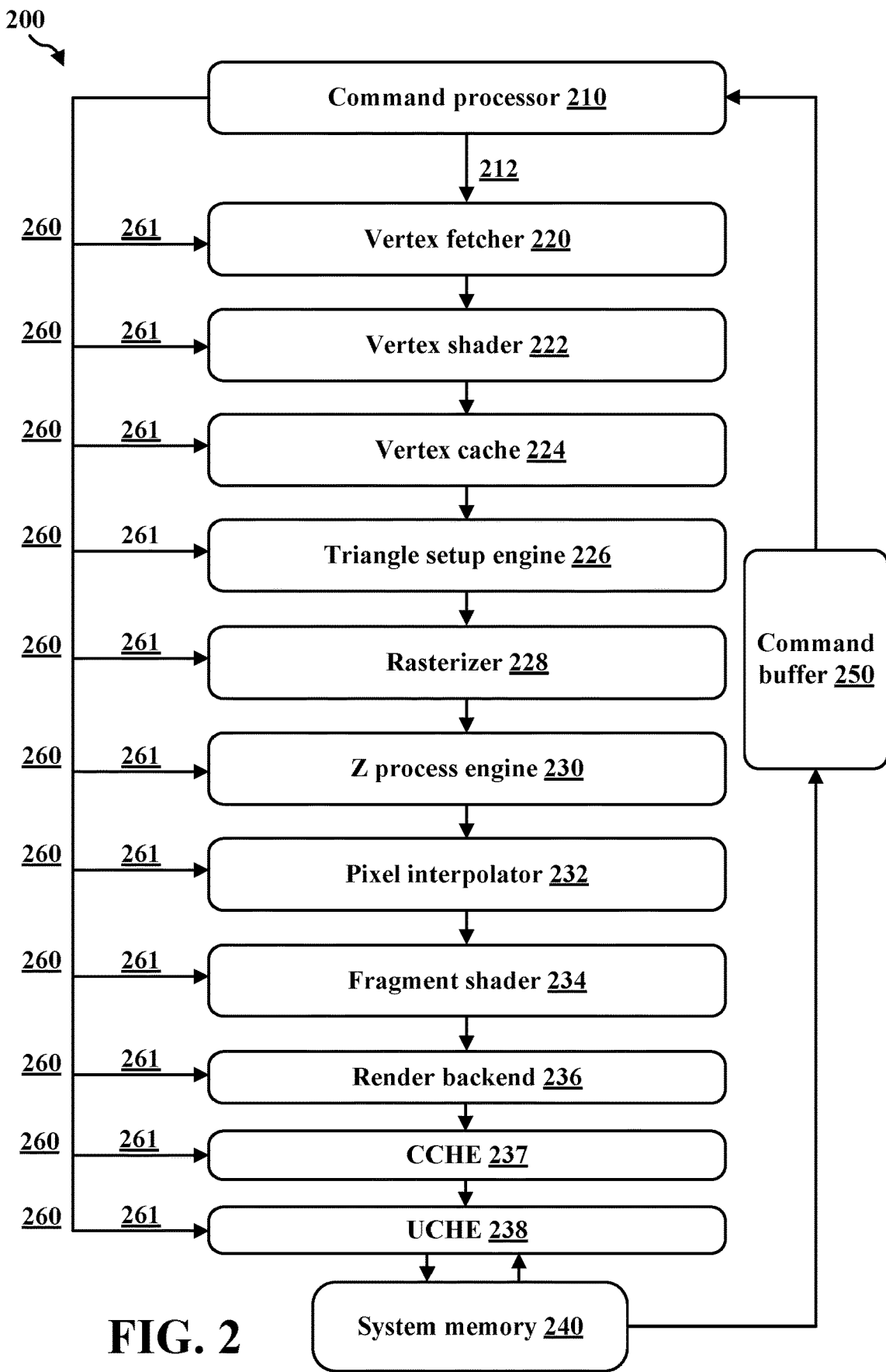
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1. GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Figure 3:
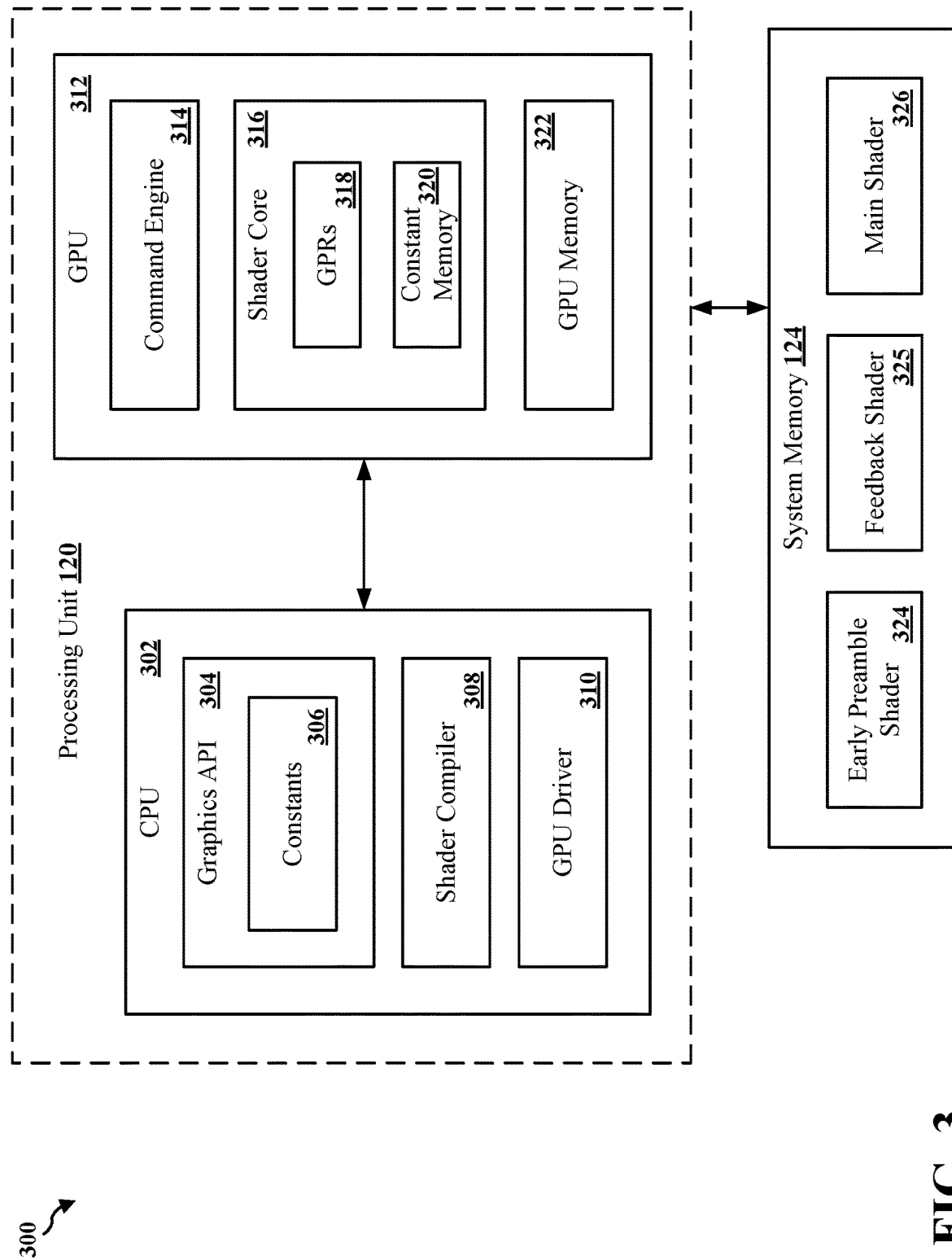
FIG. 3 is a diagram illustrating example processing components.

FIG. 3 is a diagram 300 that illustrates processing components, such as the processing unit 120 and the system memory 124, as may be identified in connection with the device 104 for processing data. In aspects, the processing unit 120 may include a CPU 302 and a GPU 312. The GPU 312 and the CPU 302 may be formed as an integrated circuit (e.g., a system-on-a-chip (SOC)) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams.

The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of an early preamble shader 324, a feedback shader 325, or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the early preamble shader 324, the feedback shader 325, and the main shader 326. The main shader 326 may correspond to a portion or the entirety of the shader program that does not include the early preamble shader 324 or the feedback shader 325. The shader compiler 308 may receive instructions to compile the shader(s) 324-326 from a program executing on the CPU 302. The shader compiler 308 may also identify constant load instructions and common operations in the shader program for including the common operations within the early preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the early preamble shader 324 and a preamble shader end to indicate an end of the early preamble shader 324. Similar instructions may be used for the feedback shader 325 and the main shader 326. The feedback shader 325 will be described in further detail below.

The shader core 316 included in the GPU 312 may include general purpose registers (GPRs) 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the early preamble shader 324 or the feedback shader 325 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

Figure 4:
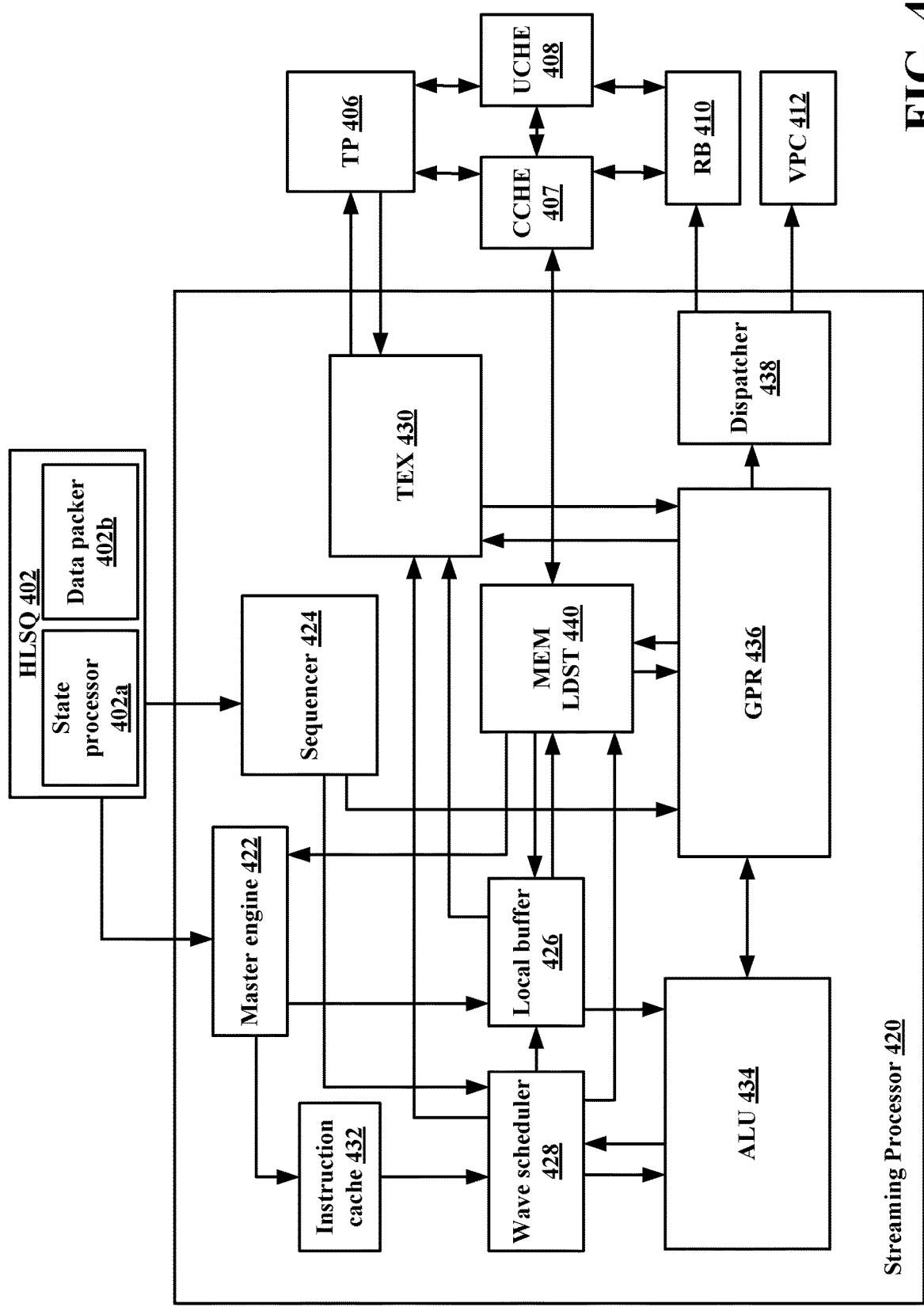
FIG. 4 is a diagram illustrating an example GPU.

FIG. 4 illustrates an example GPU 400. Specifically, FIG. 4 illustrates a streaming processor (SP) system in GPU 400. As shown in FIG. 4, GPU 400 includes a high level sequencer (HLSQ) 402, texture processor (TP) 406, level 1 (L1) cache (cluster cache (CCHE)) 407, level 2 (L2) cache (UCHE) 408, render backend (RB) 410, and vertex cache (VPC) 412. GPU 400 also includes SP 420, master engine 422, sequencer 424, local buffer 426, wave scheduler 428, texture (TEX) 430, instruction cache 432, arithmetic logic unit (ALU) 434, GPR 436, dispatcher 438, and memory (MEM) load store (LDST) 440.

As shown in FIG. 4, each unit or block in GPU 400 may send data or information to other blocks. For instance, HLSQ 402 may send commands to the master engine 422. Also, HLSQ 402 may send vertex threads, vertex attributes, pixel threads, pixel attributes, and/or compute commands to the sequencer 424. TP 406 may receive texture requests from TEX 430, and send texture elements (texels) back to the TEX 430. Further, TP 406 may send memory read requests to and receive memory data from CCHE 407 or UCHE 408. CCHE 407 or UCHE 408 may also receive memory read or write requests from MEM LDST 440 and send memory data back to MEM LDST 440, as well as receive memory read or write requests from RB 410 and send memory data back to RB 410. Also, RB 410 may receive an output in the form of color from GPR 436, e.g., via dispatcher 438. VPC 412 may also receive output in the form of vertices from GPR 436, e.g., via dispatcher 438. GPR 436 may send address data or receive write back data from MEM LDST 440. GPR 436 may also send temporary data to and receive temporary data from ALU 434. Moreover, ALU 434 may send address or predicate information to the wave scheduler 428, as well as receive instructions from wave scheduler 428. Local buffer 426 may send constant data to ALU 434. TEX 430 may also receive texture attributes from or send texture data to GPR 436, as well as receive constant data from local buffer 426. Further, TEX 430 may receive texture requests from wave scheduler 428, as well as receive constant data from local buffer 426. MEM LDST 440 may send/receive constant data to/from local buffer 426. Sequencer 424 may send wave data to wave scheduler 428, as well as send data to GPR 436. The sequencer 424 may allocate resources and local memory. Also, the sequencer 424 may allocate wave slots and any associated GPR 436 space. For example, the sequencer 424 may allocate wave slots or GPR 436 space when the HLSQ 402 issues a pixel tile workload to the SP 420. Master engine 422 may send program data to instruction cache 432, as well as send constant data to local buffer 426 and receive instructions from MEM LDST 440. Instruction cache 432 may send instructions or decode information to wave scheduler 428. Wave scheduler 428 may send read requests to local buffer 426, as well as send memory requests to MEM LDST 440.

As further shown in FIG. 4, the HLSQ 402 may prepare one or more context states for the SP 420. For example, the HLSQ 402 may prepare the context states for different types of data, e.g., global register data, shader constant data, buffer descriptors, instructions, etc. Additionally, the HLSQ 402 may embed context states into a command stream to the SP 420. The master engine 422 may parse the command stream from the HLSQ 402 and setup an SP global state. Moreover, the master engine 422 may fill or add to an instruction cache 432 and/or a local buffer 426 or a constant buffer. In some aspects, inside the HLSQ 402, there may be an internal function unit called a state processor 402a. The state processor 402a may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 402 may execute the preamble shader and, as a result, skip utilizing a main shader. In some instances, the main shader may perform different shading tasks, such as normal vertex shading and/or a fragment shading program. Moreover, the HLSQ 402 may include a data packer 402b.

Additionally, as shown in FIG. 4, the SP 420 may not be limited to executing a preamble if the HLSQ 402 decides to skip a preamble execution. For instance, the SP 420 may also process a conventional graphics workload, such as vertex shading and/or fragment shading. In some aspects, the SP 420 may utilize its execution units and storage in order to process compute tasks as a general purpose GPU (GPGPU). Inside the SP 420, there may be multiple parallel instruction execution units such as an ALU, elementary function unit (EFU), branching unit, TEX, general memory read and write (aka LDST), etc. The SP 420 may also include on-chip storage memory, such as a GPR 436 which may store per-fiber private data. Also, the SP 420 may include a local buffer 426 which stores per-shader or per-kernel constant data, per-wave uniform data (aka uGPR), and per-compute work group (WG) local memory (LM). Processing a preamble shader may take up one wave slot. Further, the majority of preamble shaders may use just the uGPR and not the GPR, and may execute ALU instructions on a scalar ALU. Therefore, execution of the preamble shader may be associated with high performance, and may be power efficient because any available wave slot may be used to execute the preamble shader even without GPR space allocation.

Moreover, as shown in FIG. 4, dispatcher 438 may fetch data from GPR 436.

Dispatcher 438 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

Figure 5:
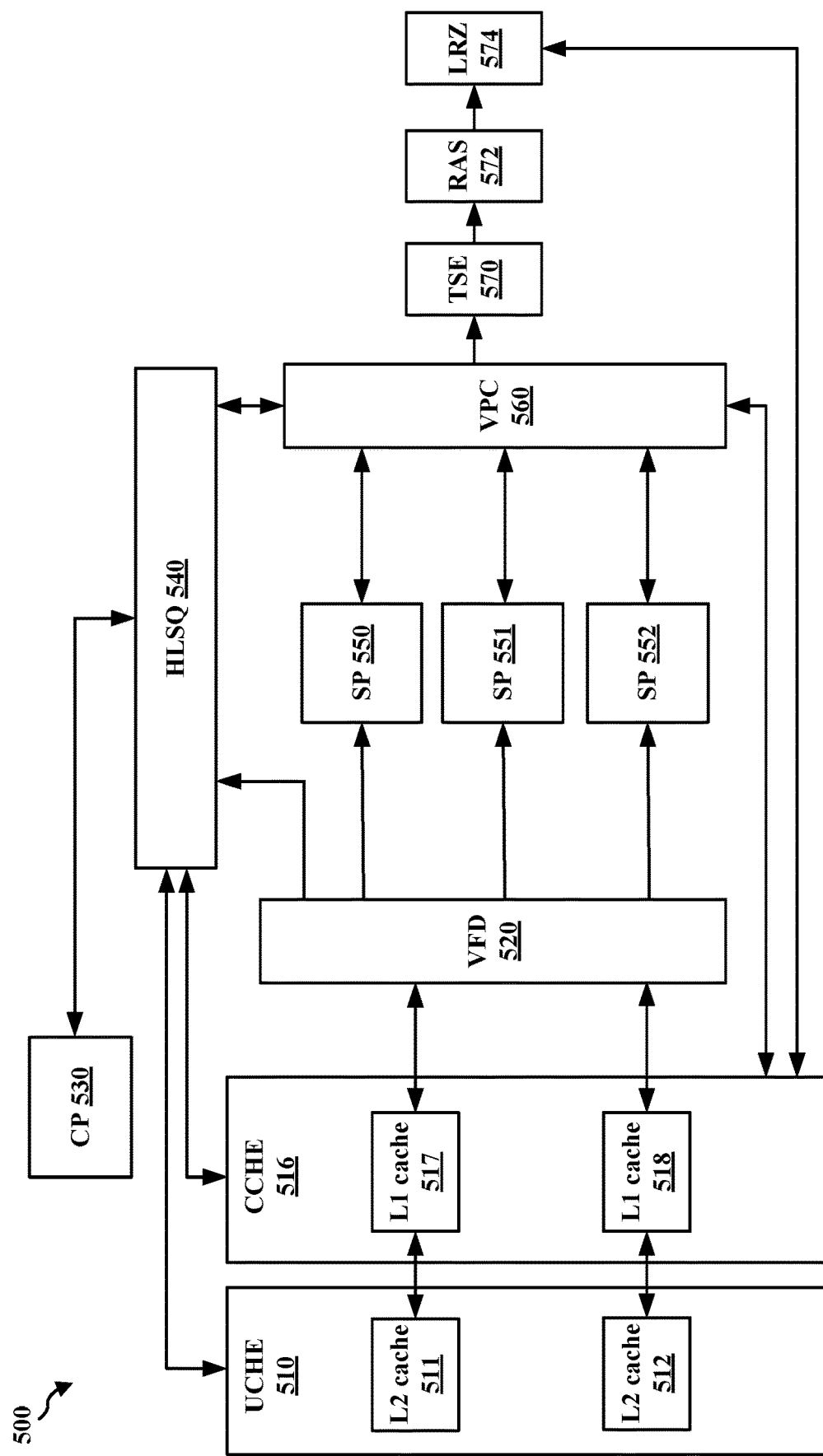
FIG. 5 is a diagram illustrating an example GPU.

FIG. 5 is a diagram illustrating another example GPU. More specifically, FIG. 5 depicts GPU 500 including a number of different components. As shown in FIG. 5, GPU 500 includes UCHE 510 including L2 cache 511 and L2 cache 512, CCHE 516 including L1 cache 517 and L1 cache 518, VFD 520, CP 530, HLSQ 540, a number of SPs (e.g., SP 550, SP 551, and SP 552), VPC 560, TSE 570, RAS 572, and low resolution Z (LRZ) component (e.g., LRZ 574). As shown in FIG. 5, CP 530 may transmit data to HLSQ 540 and receive data from HLSQ 540. CCHE 516 may transmit/receive data to/from HLSQ 540. UCHE 510 may also transmit/receive data to/from HLSQ 540. L2 cache 511 and L2 cache 512 may transmit/receive data to/from VFD 520. Further, VFD 520 may transmit data to HLSQ 540, as well as transmit data to SPs 550-552. Moreover, SPs 550-552 may transmit/receive data to/from VPC 560. Also, VPC 560 may transmit/receive data to/from HLSQ 540. Data can also be transmitted from VPC 560 to TSE 570, which can transmit data to RAS 572, and then to LRZ 574. CCHE 516 can transmit/receive data to/from VPC 560 and LRZ 574. Also, UCHE 510 can transmit/receive data to/from VPC 560 and LRZ 574.

As depicted in FIG. 5, GPUs (e.g., GPU 500) may include a number of different caches. GPUs utilize caches for a variety of reasons, such as to transfer data at a sufficiently high rate of speed. That is, as processing power for GPUs has increased at a higher rate than memory access speed, storage resources (e.g., caches) between the processor and memory have been utilized to transfer data at a sufficient rate. Caches at GPUs are also utilized to more seamlessly transfer data. One benefit of caches is that they provide buffering, so caches and buffers may be similar. For instance, caches may decrease latency by reading data from memory in larger chunks based on subsequent data accessing nearby address locations. Also, caches may increase throughput by assembling multiple small transfers into larger, more efficient memory requests. These benefits may be achieved by a cache storing data in blocks called cache lines. A cache line may be a portion of data that can be mapped into a cache. For example, a cache line may be a smallest portion of data that can be mapped into a cache.

In some aspects, each mapped cache line may be associated with a block (e.g., a core line), which is a corresponding region on a main memory or a backend storage). A backend storage may allow performance for the cache and GPU to improve. For example, database caching may allow an increased throughput and a reduced data retrieval latency associated with backend databases, which may improve the overall performance of the cache and GPU. Also, in some aspects, both the cache and main memory/backend storage may be divided into blocks of the size of a cache line.

Further, all the cache mappings may be aligned to these blocks. Cache lines may have a certain size (e.g., between 32 to 512 bytes), and memory transactions may be performed in units of cache lines. Individual cache accesses made by code that executes on a GPU processor may be smaller than these units of cache lines (e.g., 4 bytes).

Figure 6:
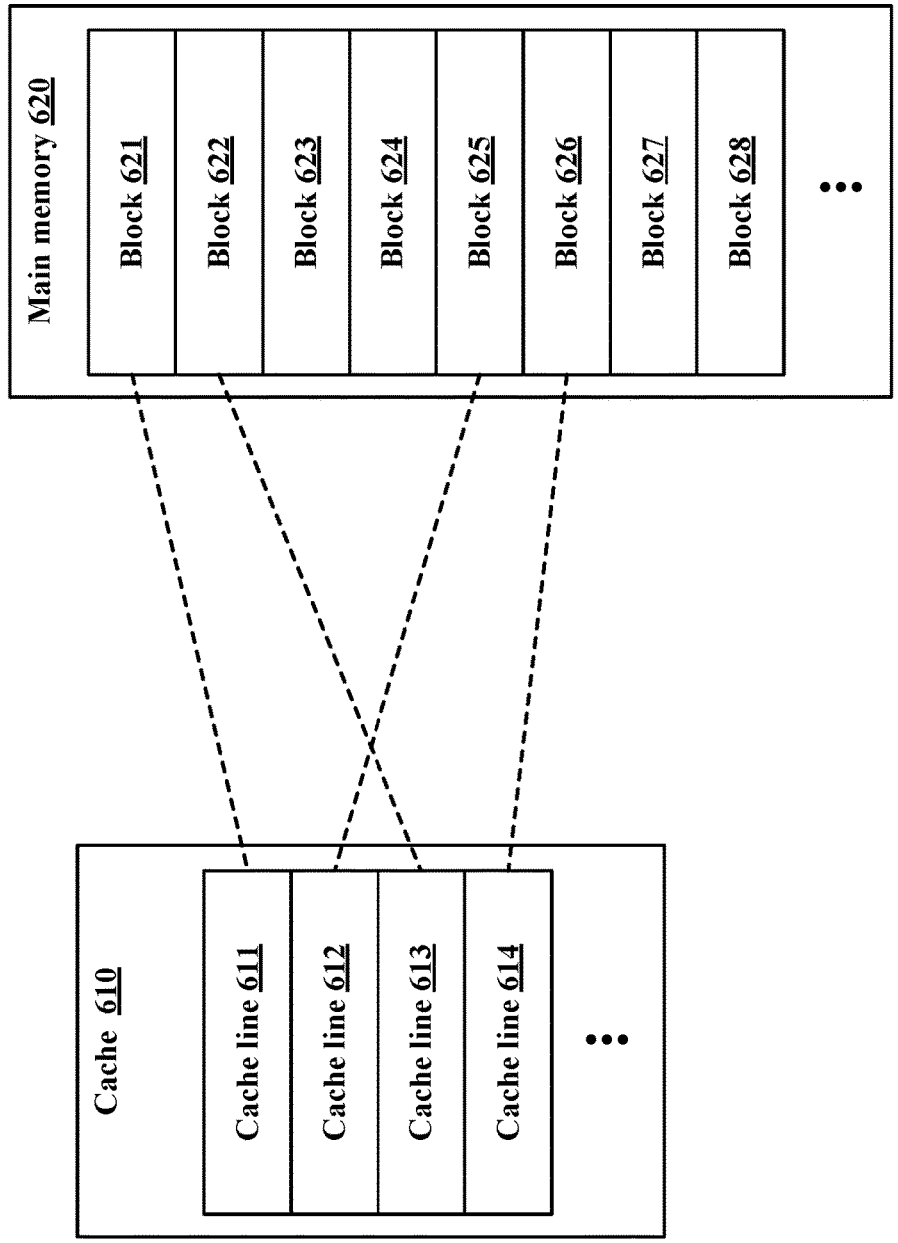
FIG. 6 is a diagram illustrating an example mapping of a cache.

FIG. 6 is a diagram 600 illustrating an example mapping of a cache. More specifically, FIG. 6 depicts a cache mapping 602 for a cache 610 and a main memory 620. That is, FIG. 6 depicts the relationship between cache lines in cache 610 (e.g., cache line 611, cache line 612, cache line 613, and cache line 614) and blocks in main memory 620 (e.g., block 621, block 622, block 623, block 624, block 625, block 626, block 627, and block 628). As shown in FIG. 6, diagram 600 illustrates that individual blocks 621-628 may be directly mapped to individual cache lines 611-614. For example, as illustrated in diagram 600, block 621 may be mapped to cache line 611, block 622 may be mapped to cache line 613, block 625 may be mapped to cache line 612, and block 626 may be mapped to cache line 614. Some of the blocks 621-628 may not be directly mapped to cache lines 611-614. For instance, block 623, block 624, block 627, and block 628 may not be directly mapped to cache lines 611-614. In some aspects, main memory 620 including blocks 621-628 may be a backend storage including a number of core lines.

Valid data (e.g., valid bits) and dirty data (e.g., dirty bits) may correspond to a current cache line state. For instance, when a cache line is valid (i.e., in a valid state) it may refer to the cache line being mapped to a block in main memory (e.g., a core line determined by a core identifier (ID) and a core line number). When a cache line is invalid (i.e., in an invalid state), it may be used to map a core line accessed by a certain request (e.g., an input/output (I/O) request), and the cache line may become valid thereafter. A cache line may return to an invalid state based on a number of different reasons. For example, a cache line may return to an invalid state: if the cache line is being evicted, if the core pointed to by the core ID is being removed, if the core pointed to by the core ID is being purged, if the entire cache is being purged, during a discard operation being performed on a corresponding core line, or during a certain request (e.g., an I/O request) when a cache mode which may perform an invalidation is selected.

In some aspects, dirty data or modified data may refer to data that is associated with a block of memory and indicates whether the corresponding block of memory has been modified. For example, a dirty bit or modified bit may be a bit that is associated with a block of memory and indicates whether the corresponding block of memory has been modified. The dirty data (e.g., dirty bit) may be set when a processor writes to (i.e., modifies) this memory. For instance, the dirty data (e.g., dirty bit) may indicate that its associated block of memory has been modified and has not been saved to storage yet. That is, "dirty data" may refer to data in a cache that is modified, but the memory still has an old or stale copy of the data. In some instances, when a block of memory is to be replaced, its corresponding dirty data (e.g., dirty bit) may be checked to determine if the block may need to be written back to secondary memory before being replaced or if it can simply be removed. Moreover, dirty data (e.g., dirty bit) may determine if the cache line data stored in the cache is in synchronization with corresponding data on the backend storage. For instance, if a cache line is dirty, then data on the cache storage may be up to date, and the data may need to be flushed (i.e., removed) at some point in the future (e.g., after the flushing the data may be marked as clean by zeroing a dirty bit). Also, a cache line may be considered valid if at least one of its sectors is valid. Likewise, a cache line may be considered dirty if at least one of its sectors is dirty.

In some instances, a goal of caches in GPUs may be to increase the performance of repeated accesses to the same data, as caches may keep a copy of a subset of the data in memory. Accordingly, subsequent accesses of the data already in the cache may not utilize an expensive memory access transaction. As some caches may have a smaller capacity than the memory size of the GPU system, the currently-cached data set may continuously change. This continuously change in cached data may be due to the memory access pattern of the executed code and/or the data replacement policy of the cache. This performance improvement may be important for GPUs, as GPUs may serve numerous simultaneously running threads with data.

Caches may receive a number of requests (e.g., data or content requests) to store or cache data. A cache hit may refer to an event when data requested for processing (e.g., requested by a component or application) is successfully retrieved from the cache memory. For example, a cache hit may describe when data or content is successfully found in the cache. That is, a cache hit may be when a system or application makes a request to retrieve data from a cache, and the specific data is currently in cache memory. A cache miss may refer to an event when data requested for processing (e.g., requested by a component or application) is not successfully retrieved from the cache memory. For example, a cache miss may describe when data or content is not successfully found in the cache. That is, a cache miss may be when a system or application makes a request to retrieve data from a cache, but that specific data is not currently in cache memory. Caches may be measured based on an amount of data requests that the cache is able to successfully fill.

There are a number of different types of caches that are utilized by GPUs. For instance, there are fully-associative caches, direct-mapped caches, and set-associative cache. A fully-associative cache may utilize a least recently used (LRU) cache policy, where there are a number of cells (e.g., M cells) that are each capable of holding a cache line corresponding to any of the memory locations (e.g., N memory locations). In the case of cache contention, the cache line that is not accessed the longest may be kicked out and replaced with a new cache line. A direct-mapped cache may directly map a block of memory to a single cache line which it can occupy. A set-associative cache may divide the address space into equal groups, which separately act as small fully-associative caches.

An associativity of a cache may refer to the size of the cache sets, or, i.e., how many different cache lines each data block can be mapped to. That is, the associativity of a cache may refer to a number of cache lines that are associated with a cache set for the cache. A cache set may include the number of cache lines in the cache. A higher associativity may result in a more efficient utilization of a cache, but may also increase the power/cost utilized by the cache. Likewise, a lower associativity may decrease the power/cost utilized by the cache, but may result in a less efficient utilization of the cache. The capacity of a cache may refer to the amount of data or information that can be stored in the cache. Additionally, the capacity or associativity of the cache may be adjusted based on a number of different factors of the GPU.

As caches may store and retrieve data from memory, in some instances, caches may experience memory latency. For instance, memory latency may be the time (i.e., latency) elapsed from an initial request for data until the data is actually retrieved. That is, memory latency may refer to time elapsed from an initiation of a request for a data (e.g., a byte or word) in memory until it is retrieved from the memory (e.g., retrieved from the memory by a processor). In comparison, memory latency measures a time elapsed to actually retrieve data from memory, while memory bandwidth measures a throughput of the memory. In some aspects, if the data is not in the memory or cache, it may take a longer period of time to obtain the data, thus resulting in an increased memory latency (e.g., the processor may have to communicate with external memory cells. For instance, memory latency may be a measure of the speed of the memory, such that a faster the reading operation will have a reduced memory latency and a slower the reading operation will have an increased memory latency. Memory latency may be expressed in different measurements of time (e.g., in actual time elapsed (such as ns) or clock cycles).

An average memory latency may refer to the average time elapsed from a request for data until the data is actually retrieved. The average memory latency may be calculated or determined based on an average of a number of data requests for a cache. In some aspects, a high average memory latency for a cache (i.e., higher than a threshold for an average memory latency) may negatively impact performance (e.g., performance at a GPU). Also, an optimized level (i.e., ideal level) of cache associativity may vary based on the type of application that is running (e.g., an application on a GPU or CPU), and the optimized level of cache associativity may vary at run-time (e.g., run-time of a GPU or CPU). That is, cache associativity may vary from application-to-application, and even within a single application, an ideal cache associativity may vary at run-time. In some instances, cache access patterns for GPUs may vary during run-time, and a GPU cache may have a high associativity. Moreover, depending on the application that is running on the GPU, a high associativity may not be needed, such that the ideal cache associativity may vary. Based on the above, it may be beneficial to utilize caches that combat or reduce a high average memory latency. For instance, it may be beneficial to utilize a cache in order to account for variance in cache associativity, as well as to combat a high average memory latency.

Aspects of the present disclosure may utilize reconfigurable or adjustable caches. That is, aspects presented herein may adjust or reconfigure a configuration (e.g., data storage configuration) of caches in order to reduce or combat high average memory latency. For instance, aspects presented herein may adjust or reconfigure an associativity of a cache and/or a number of cache sets of a cache. Indeed, aspects presented herein (e.g., GPUs or CPUs) may adjust or reconfigure an organization of a cache associativity and/or an organization of a number of cache sets. Aspects presented herein (e.g., GPUs or CPUs) may adjust the organization of cache associativity in order to account for a variance in cache associativity (e.g., based on a type of application running), as well as to combat a high average memory latency.

For example, GPUs may adjust a first configuration of a cache associativity to a second configuration of a cache associativity based on a type of application (e.g., an application running on the GPU). Likewise, GPUs may adjust a first configuration of a number of cache sets to a second configuration of a number of cache sets based on a type of application (e.g., an application running on the GPU). The aforementioned adjustable or reconfigurable caches may be applied to different levels of caches (e.g., a level 1 (L1) cache, a level 2 (L2) cache, a level 3 (L3) cache, etc.).

In some instances, aspects presented herein may observe or monitor the average memory latency at run-time at every observation interval of a number of cache accesses (e.g., T cache accesses). The number of cache accesses may be a configurable parameter (e.g., 1500 cache accesses, which may be configurable). After this, aspects presented herein may flush any dirty data (i.e., modified data) in the cache, and then invalidate the cache. In some aspects, there may be a latency penalty for flushing the dirty data, which may be taken into account. In one example, at the end of first observation interval (i.e., time interval), there may be an average memory latency (e.g., latency L1) for a full associativity (e.g., associativity A). Before a beginning of a second observation interval, the associativity may be reduced (e.g., reduced by a factor of two). Likewise, the number of cache sets may be increased (e.g., increased by a factor of two). That is, a product of the associativity of the cache and the number of cache sets of the cache corresponds to a capacity level of the cache, such that increasing the associativity of the cache and decreasing the number of cache sets of the cache (e.g., doubling the associativity and halving the number of cache sets) may maintain a constant capacity level for the capacity level of the cache. Further, as a product of the associativity of the cache and the number of cache sets of the cache corresponds to a capacity level of the cache, decreasing the associativity of the cache and increasing the number of cache sets of the cache (e.g., halving the associativity and doubling the number of cache sets) may maintain a constant capacity level for the capacity level of the cache. For instance, as the cache capacity will stay the same size, if the associativity is reduced, the number of sets in the cache may correspondingly increase. Likewise, as the cache capacity will stay the same size, if the associativity is increased, the number of sets in the cache may correspondingly decrease. For example, if the associativity is reduced in half, the number of cache sets will double.

In some instances, at a later time period (e.g., the end of a second observation interval), the average memory latency (e.g., latency L2) may be calculated for associativity (e.g., associativity A/2). After this, aspects presented herein may flush the modified data or dirty data from the cache, and then invalidate the entire cache. When doing so, the cache latency penalty may be taken into account. Before a beginning of third observation interval, the associativity may be increased (e.g . . . increased to twice the original associativity), and since the associativity is increased and the cache capacity is the same, the number of cache sets may be likewise reduced (e.g., reduced in half). At the end of this later time period (e.g., the end of a third observation interval), the average memory latency (e.g., latency L3) may be calculated for the increased associativity. Depending on whichever configuration has a lowest average memory latency (e.g., latency L1, latency L2, or latency L3), the corresponding configuration may be maintained for a number of time intervals (e.g., a next 10 observation intervals). For example, this may be the configuration with the original associativity (e.g., A), the configuration with half the associativity (e.g., A/2), or the configuration with twice the associativity (e.g., 2A). And at the end of the number of time intervals (e.g., 10 observation intervals), the process may be repeated.

Figure 7:
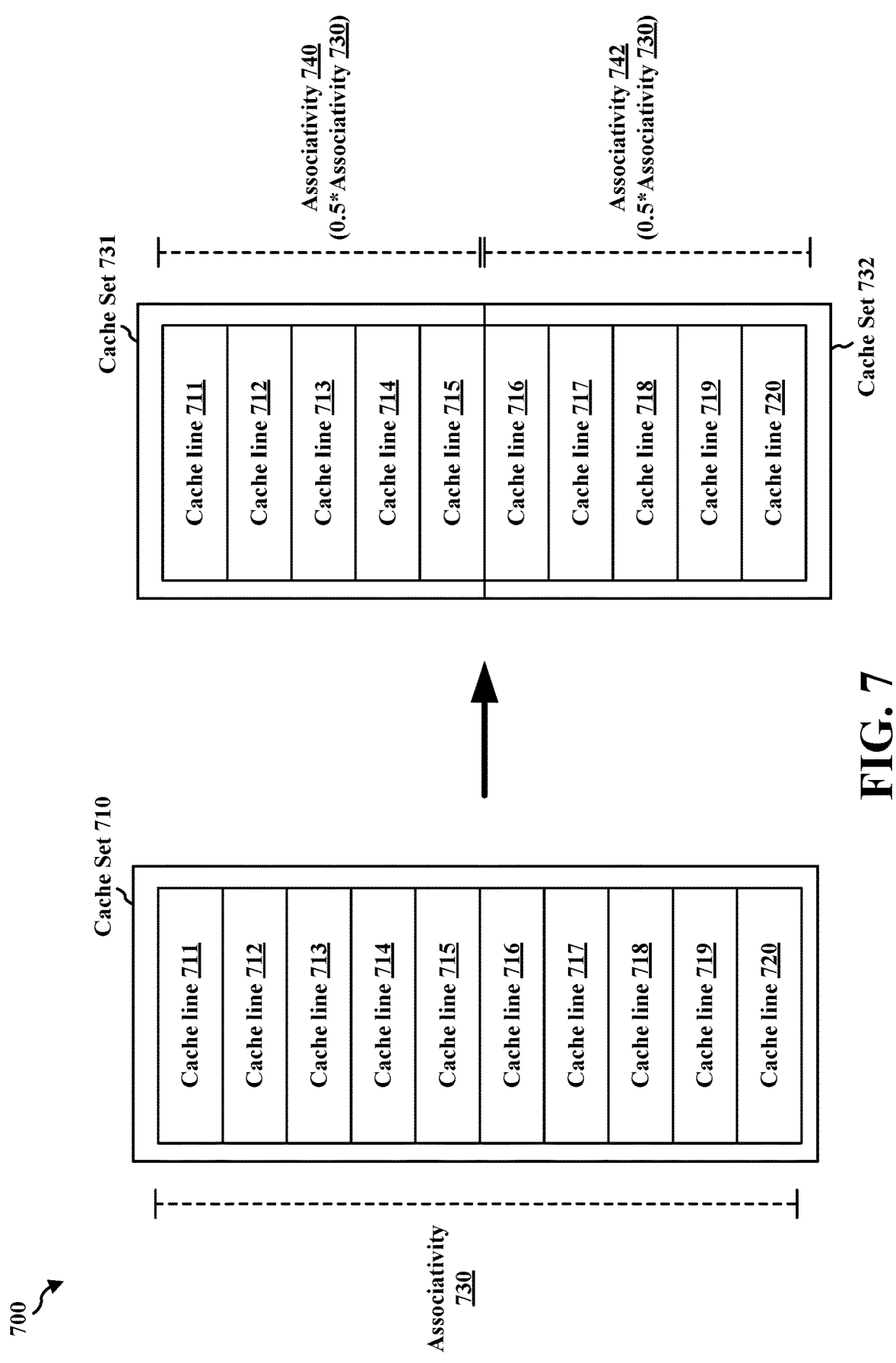
FIG. 7 is a diagram illustrating an example associativity levels for a cache.

As indicated above, aspects presented herein may utilize configurable caches with varying associativity. In order to do so, aspects presented herein (e.g., GPUs or CPUs) may monitor the average memory latency at run-time at every observation interval of a number of cache accesses. In one example, at a first step, at an end of a first observation interval (time interval), a GPU may monitor and determine that the cache may have a certain memory latency (i.e., average memory latency L1). This average memory latency (e.g., latency L1) may correspond to a full associativity (A) of the cache. Aspects presented herein may flush dirty data and invalidate the cache, for which a latency penalty is taken into account. At a second step, aspects presented herein may allow GPUs to reduce the associativity of the cache (e.g., reduce the associativity from full associativity A to half associativity A/2) and double the number of cache sets in order to keep the overall cache capacity the same. At an end of a second observation interval, GPUs or CPUs may calculate an average memory latency (e.g., latency L2). Also, a reduced associativity tag latency may be reduced by a cycle. Again, aspects presented herein may flush dirty data and invalidate the cache, for which a latency penalty is taken into account. At a third step, before a beginning of third observation interval, the associativity may be increased (e.g., doubled to 2A) and the number of cache sets may be reduced (e.g., reduced in half) in order to keep the overall cache capacity/size the same. At an end of a third observation interval, the average memory latency may be calculated (e.g., latency L3). Also, an increased associativity tag latency may be increased by a cycle. At a fourth step, depending on whichever configuration has the lowest average memory latency, aspects presented herein may keep that configuration for a subsequent time period (e.g., the next ten observation intervals). At the end of this time period, the process may be repeated. FIG. 7 is a diagram 700 illustrating example associativity levels for a reconfigurable cache. More specifically. FIG. 7 depicts a full associativity and a reduced associativity for a reconfigurable cache. As shown in FIG. 7, diagram 700 illustrates cache set 710 including a number of cache lines (e.g., cache line 711, cache line 712, cache line 713, cache line 714, cache line 715, cache line 716, cache line 717, cache line 718, cache line 719, and cache line 720) including an associativity 730. The associativity 730 may correspond to the number of cache lines (e.g., cache lines 711-720) that are associated with the cache set 710. FIG. 7 depicts that associativity 730 for cache set 710 may be adjusted to associativity 740 and/or associativity 742 based on the reconfigurable cache. For instance, based on the reconfigurable cache, diagram 700 further illustrates that associativity 740 corresponds to cache set 731 including an adjusted number of cache lines (e.g., cache line 711, cache line 712, cache line 713, cache line 714, and cache line 715). Further, based on the reconfigurable cache, diagram 700 illustrates that associativity 742 corresponds to cache set 732 including an adjusted number of cache lines (e.g., cache line 716, cache line 717, cache line 718, cache line 719, and cache line 720). That is, the associativity 740 may correspond to the adjusted number of cache lines (e.g., cache lines 711-715) that are associated with the cache set 731 and associativity 742 may correspond to the adjusted number of cache lines (e.g., cache lines 716-720) that are associated with the cache set 732. Also, the dirty data may be flushed from the cache and the cache may be invalidated. As shown in FIG. 7, associativity 730 may be reduced to be associativity 740 (e.g., half of associativity 730) and/or associativity 742 (e.g., half of associativity 730). More specifically, FIG. 7 depicts a full associativity (e.g., associativity 730) compared to one half associativity (e.g., associativity 740) and another half associativity (e.g., associativity 742) for a single cache set. For instance, associativity 740 and associativity 742 may be the result of reconfiguring the cache in order to optimize the average memory latency of the cache.

FIG. 7 illustrates another example of a reconfigurable cache with an adjustable associativity and/or number of cache sets. For example, as depicted in FIG. 7, a number of address bits (e.g., Ai, Ai+1, . . . , etc.) may represent a set address for a certain associativity (e.g., associativity A). After adjusting the associativity, the set address for the adjusted associativity (e.g., associativity A/2) may be equal to the adjusted address bits (e.g., Ai, Ai+1, . . . . An, An+1), as number of sets will be adjusted (e.g., doubled). Also, the newly adjusted bit (e.g., An+1) may determine which portion of the ways for comparing to the tag address in order to determine the cache hit. FIG. 7 depicts that a typical cache may have many cache sets, which may depend on the size of the cache. For a given cache set (e.g., a 16-way cache set), when the cache set is reduced (e.g., reduced to an 8-way cache set), the single cache set may be likewise reduced (e.g., cut in half). So each set may have two sets (e.g., 8-way sets). Also, depending on the address bits, a GPU may identify which portion of the cache may be needed to determine whether there is a cache hit or not (i.e., the associativity is cut by half).

Figure 8:
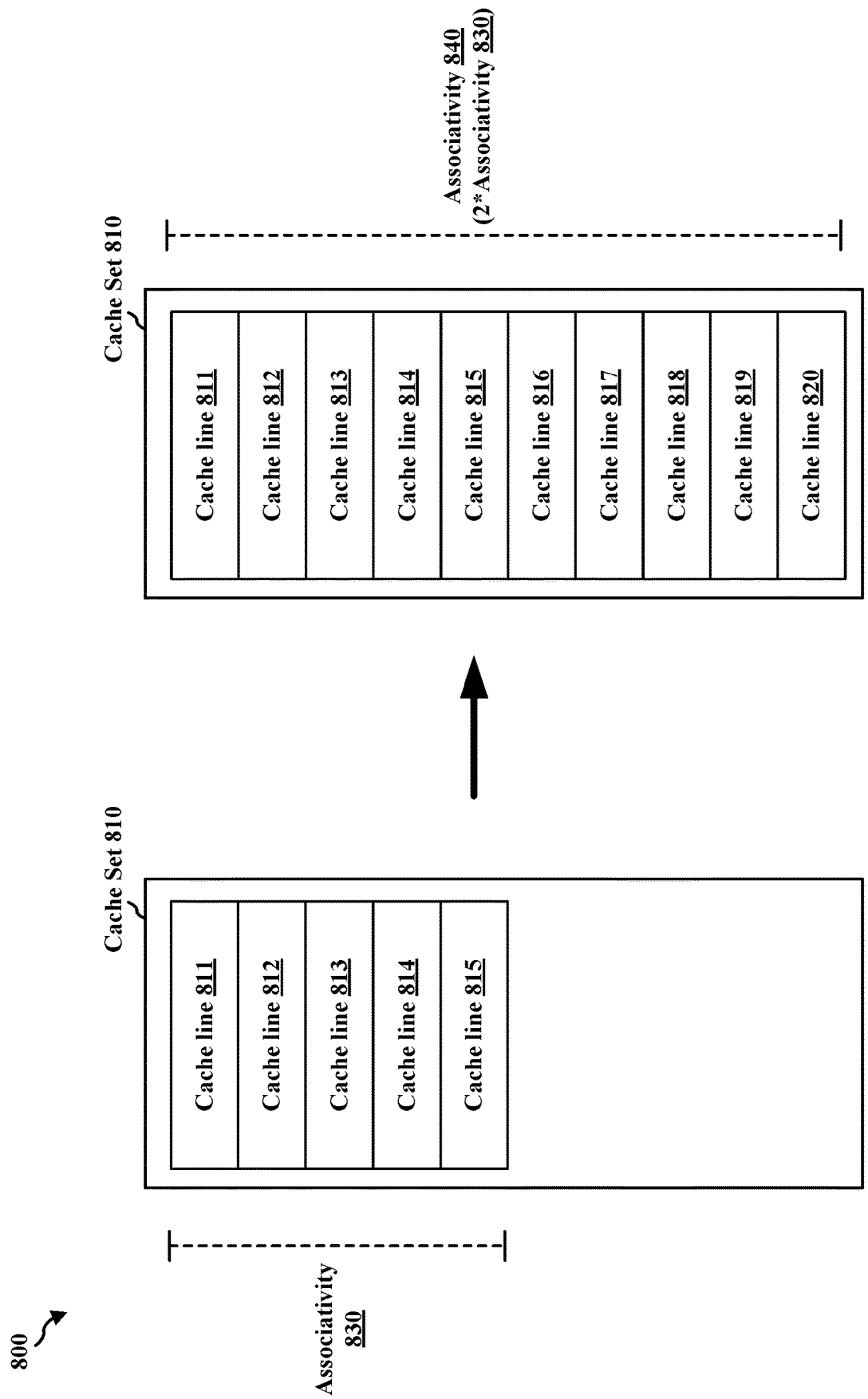
FIG. 8 is a diagram illustrating an example associativity levels for a cache.

FIG. 8 is a diagram 800 illustrating example associativity levels for a reconfigurable cache. More specifically, FIG. 8 depicts a full associativity and an increased associativity for a reconfigurable cache. As shown in FIG. 8, diagram 800 illustrates cache set 810 including a number of cache lines (e.g., cache line 811, cache line 812, cache line 813, cache line 814, and cache line 815) including an associativity 830. The associativity 830 may correspond to the number of cache lines (e.g., cache lines 811-815) that are associated with the cache set 810. FIG. 8 depicts that associativity 830 for cache set 810 may be adjusted to associativity 840 based on the reconfigurable cache. For instance, based on the reconfigurable cache, diagram 800 further illustrates that associativity 840 corresponds to cache set 810 including an adjusted number of cache lines (e.g., cache line 811, cache line 812, cache line 813, cache line 814, cache line 815, cache line 816, cache line 817, cache line 818, cache line 819, and cache line 820). That is, the associativity 840 may correspond to the adjusted number of cache lines (e.g., cache lines 811-820) that are associated with the cache set 810. As shown in FIG. 8, associativity 830 may be increased to be associativity 840 (e.g., twice of associativity 830). More specifically, FIG. 8 depicts a full associativity (e.g., associativity 830) compared to a double associativity (e.g., associativity 840) for a single cache set 810. For instance, associativity 840 may be the result of reconfiguring the cache in order to optimize the average memory latency of the cache. Additionally, before optimizing the average memory latency for the cache, the dirty data may be flushed from the cache and the cache may be invalidated.

FIG. 8 illustrates another example of a reconfigurable cache with an adjustable associativity and/or adjustable number of cache sets. For example, as depicted in FIG. 8, similar to FIG. 7, a number of address bits (e.g., Ai, Ai+1, . . . , etc.) may represent a set address for a certain associativity (e.g., associativity A). After adjusting the associativity, the set address for the adjusted associativity (e.g., associativity 2A) may be equal to the adjusted address bits (e.g., Ai, Ai+1, . . . . An−1), as number of sets will be adjusted (e.g., reduced in half). Also, the newly adjusted bit (e.g., An−1) may decide which portion of the ways for comparing to the tag address in order to determine the cache hit. This may utilize an extra bit in tag storage. As shown in FIG. 8, by increasing the associativity (e.g., doubling the associativity), a cache set (e.g., a 16-way cache set) may be an increased cache set (e.g., a 32-way cache set). For example, aspects presented herein may take two sets in the original cache set (e.g., 16-way cache set) and increase them (e.g., into a 32-way cache set). Also, the set address may be reduced by 1-bit in order to determine which pair of sets to combine to make it an increased cache (e.g., 32-way associative cache).

Figure 9:
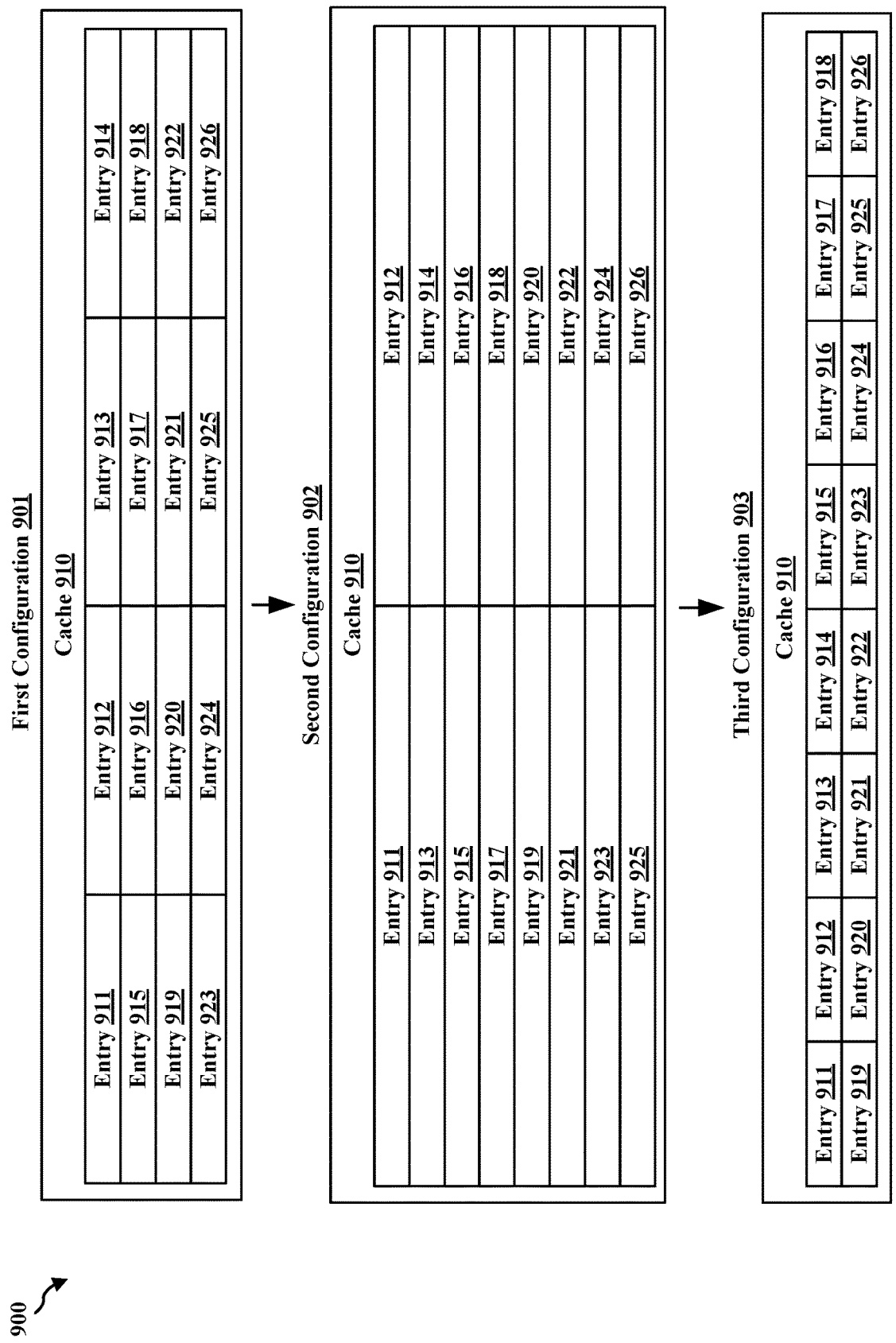
FIG. 9 is a diagram illustrating example configurations of a cache.

FIG. 9 is a diagram 900 illustrating example configurations of a cache. More specifically, FIG. 9 depicts different configurations of a cache that are adjusted based on a certain factor (e.g., average memory latency). As shown in FIG. 9, diagram 900 illustrates cache 910 including a first configuration 901 of the cache including a number of cache entries (e.g., entry 911, entry 912, entry 913, entry 914, entry 915, entry 916, entry 917, entry 918, entry 919, entry 920, entry 921, entry 922, entry 923, entry 924, entry 925, and entry 926). First configuration 901 includes a number of columns for the cache entries 911-926 (e.g., 4 columns) and a number of rows for the cache entries 911-926 (e.g., 4 rows). For instance, the number of columns may correspond to an associativity of the cache and the number of rows may correspond to a number of cache sets of the cache. As depicted in FIG. 9, first configuration 901 may include a certain associativity (e.g., an associativity of 4) and a certain number of cache sets (e.g., 4 cache sets). Further, first configuration 901 may be adjusted to second configuration 902. Second configuration 902 includes a number of columns for the cache entries 911-926 (e.g., 2 columns) and a number of rows for the cache entries 911-926 (e.g., 8 rows). As indicated above, the number of columns may correspond to an associativity of the cache and the number of rows may correspond to a number of cache sets of the cache. As depicted in FIG. 9, second configuration 902 may include a certain associativity (e.g., an associativity of 2) and a certain number of cache sets (e.g., 8 cache sets). Additionally, second configuration 902 may be adjusted to third configuration 903. Third configuration 903 includes a number of columns for the cache entries 911-926 (e.g., 8 columns) and a number of rows for the cache entries 911-926 (e.g., 2 rows). As depicted in FIG. 9, third configuration 903 may include a certain associativity (e.g., an associativity of 8) and a certain number of cache sets (e.g., 2 cache sets).

As depicted in FIG. 9, GPUs may monitor, during a first observation interval in a set of observation intervals, an average memory latency for a cache including a first configuration (e.g., first configuration 901 including cache entries 911-926). Also, GPUs may calculate, at an end of the first observation interval, a first average memory latency for the first configuration of the cache (e.g., first configuration 901 including cache entries 911-926). GPUs may also adjust, at a beginning of a second observation interval in the set of observation intervals, the first configuration of the cache (e.g., first configuration 901) to a second configuration of the cache (e.g., second configuration 902 including cache entries 911-926). In some aspects, adjusting the first configuration (e.g., first configuration 901) to the second configuration (e.g., second configuration 902) may include increasing an associativity of the cache and decreasing a number of cache sets of the cache, where a product of the associativity of the cache and the number of cache sets of the cache corresponds to a capacity level of the cache, such that increasing the associativity of the cache and decreasing the number of cache sets of the cache maintains a constant capacity level for the capacity level of the cache. Also, adjusting the first configuration (e.g., first configuration 901) to the second configuration (e.g., second configuration 902) may include decreasing an associativity of the cache and increasing a number of cache sets of the cache, where a product of the associativity of the cache and the number of cache sets of the cache corresponds to a capacity level of the cache, such that decreasing the associativity of the cache and increasing the number of cache sets of the cache maintains a constant capacity level for the capacity level of the cache. Further, GPUs may calculate, at an end of the second observation interval, a second average memory latency for the second configuration of the cache (e.g., second configuration 902 including cache entries 911-926). GPUs may also output an indication of a lowest average memory latency of the first average memory latency for the first configuration (e.g., first configuration 901) or the second average memory latency for the second configuration (e.g., second configuration 902). Moreover, GPUs may adjust, at a beginning of a third observation interval in the set of observation intervals, the second configuration of the cache (e.g., second configuration 902 including cache entries 911-926) to a third configuration of the cache (e.g., third configuration 903 including cache entries 911-926). GPUs may also calculate, at an end of the third observation interval, a third average memory latency for the third configuration of the cache (e.g., third configuration 903 including cache entries 911-926). Additionally, GPUs may output an indication of the lowest average memory latency of the first average memory latency for the first configuration (e.g., first configuration 901), the second average memory latency for the second configuration (e.g., second configuration 902), or the third average memory latency for the third configuration (e.g., third configuration 903). Further, based on the lowest average memory latency, GPUs may set the cache to the first configuration (e.g., first configuration 901), the second configuration (e.g., second configuration 902), or the third configuration (e.g., third configuration 903) for at least one remaining observation interval in the set of observation intervals.

As mentioned herein, aspects of the present disclosure may reduce the average memory latency of caches. For instance, aspects presented herein may utilize different types of configurable caches in order to optimize or reduce the average memory latency. For example, aspects presented herein may utilize an L1 cache (e.g., a cluster cache (CCHE)), an L2 cache (e.g., a UCHE), and/or an L3 cache (e.g., a last level cache (LLC)). In some instances, the configurable caches (e.g., a CCHE, UCHE, or LLC) may be utilized for a certain cache capacity (e.g., 384 kB and 768 KB capacity). In one example, for a certain reconfigurable cache (e.g., a CCHE with a 384 KB capacity), the average memory latency may be improved by a certain amount. Also, the percentage of time a certain amount of ways of the cache (e.g., half ways) are utilized may be consistently increased across certain benchmarks or applications. In another example, for a certain reconfigurable cache (e.g., a CCHE with a 768 KB capacity), the average memory latency may be improved by a certain amount. Moreover, the percentage of time a certain amount of ways of the cache (e.g., half ways) are utilized may be consistently increased across certain benchmarks or applications.

Aspects presented herein may include a number of benefits or advantages. For instance, aspects presented herein may adjust or reconfigure a configuration (e.g., data storage configuration) of caches in order to reduce or combat high average memory latency. Also, aspects presented herein may adjust or reconfigure an associativity of a cache and/or a number of cache sets of a cache. Aspects presented herein may adjust or reconfigure an organization of a cache associativity and/or an organization of a number of cache sets. Aspects presented herein may adjust the organization of cache associativity in order to account for a variance in cache associativity (e.g., based on a type of application running), as well as to combat a high average memory latency. For example, aspects presented herein may adjust a first configuration of a cache associativity to a second configuration of a cache associativity based on a type of application. Likewise, aspects presented herein may adjust a first configuration of a number of cache sets to a second configuration of a number of cache sets based on a type of application.

Figure 10:
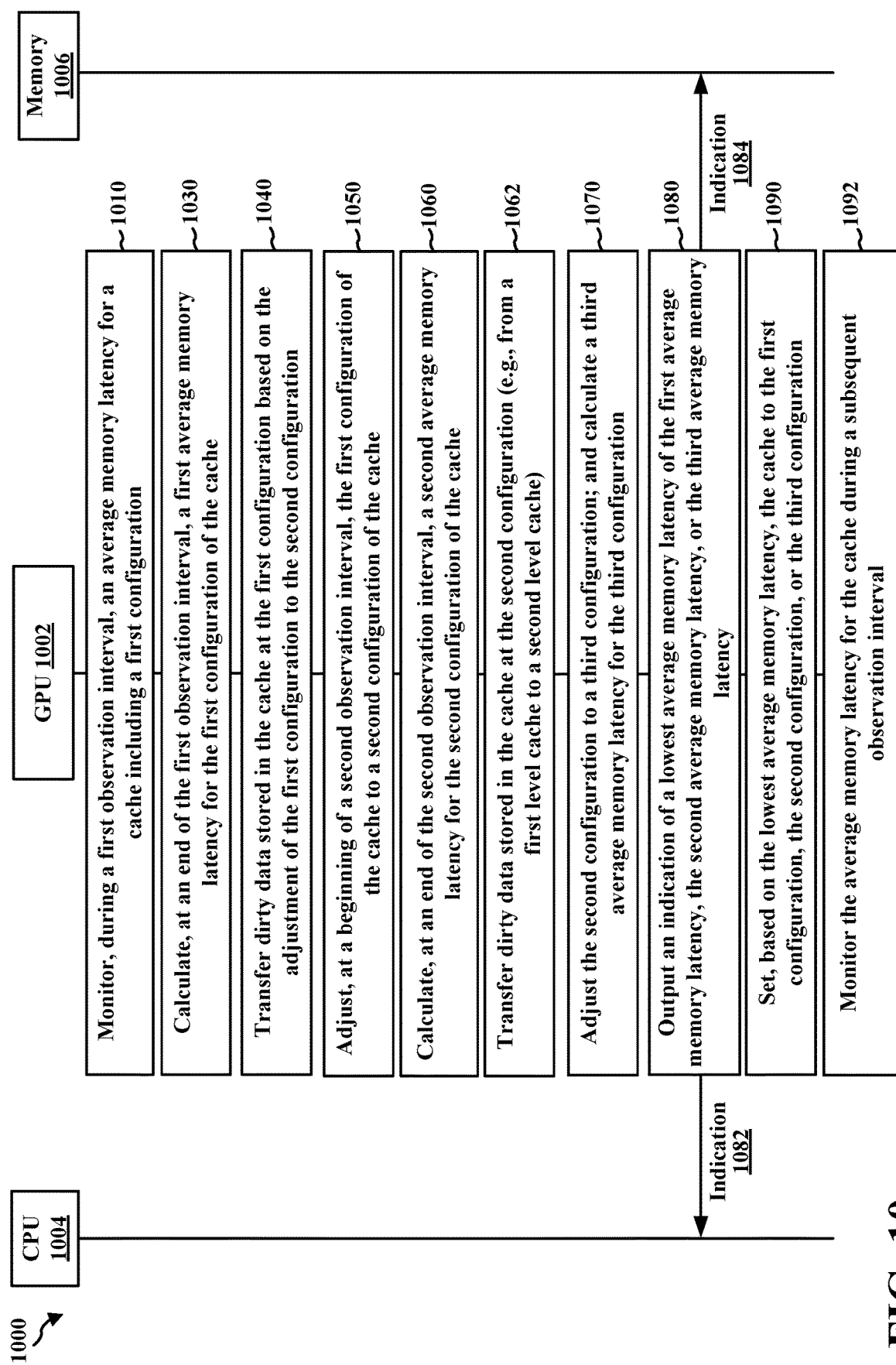
FIG. 10 is a communication flow diagram illustrating example communications between a GPU, a CPU, and a memory.

FIG. 10 is a communication flow diagram 1000 of graphics processing in accordance with one or more techniques of this disclosure. As shown in FIG. 10, diagram 1000 includes example communications between GPU 1002 (e.g., a GPU, a GPU component, another graphics processor, a CPU, a CPU component, or another central processor), CPU 1004 (e.g., a CPU, a CPU component, another central processor, a GPU, a GPU component, or another graphics processor), and memory 1006 (e.g., a system memory, a graphics memory, or a memory or cache at a GPU), in accordance with one or more techniques of this disclosure.

At 1010, GPU 1002 may monitor, during a first observation interval in a set of observation intervals, an average memory latency for a cache including a first configuration. The first configuration may correspond to a first associativity of a capacity level for the cache, and the first associativity may include a number of cache lines that are associated with a cache set for the cache. Also, the average memory latency may correspond to a latency of an average execution time for loading data from the cache, and the cache may be a level 1 (L1) cache, a level 2 (L2) cache, or a level 3 (L3) cache. Further, each of the set of observation intervals may be associated with a number of cache accesses for the cache.

Additionally, a length of the first observation interval may be configured to be adjusted based on a workload that is running on a processing device including the cache. In some aspects, the length of the first observation interval may be configured to be adjusted with a driver of the processing device. For instance, a driver may adjust an observation interval once at the beginning of a launch of a workload on a GPU. As the observation interval may be driver configurable, the driver may set an observation interval once at the beginning of a workload. Further, for different workloads, the driver may set different observation intervals. Also, the processing device may be at least one of a graphics processing unit (GPU), a central processing unit (CPU), or a digital signal processor (DSP).

At 1030, GPU 1002 may calculate, at an end of the first observation interval, a first average memory latency for the first configuration of the cache.

At 1040, GPU 1002 may transfer dirty data that is stored in the cache at the first configuration based on the adjustment of the first configuration of the cache to the second configuration of the cache. In some aspects, transferring the dirty data that is stored in the cache at the first configuration may include: transferring the dirty data from a first level of the cache to a second level of the cache. Moreover, transferring the dirty data from the first level to the second level may include: writing the dirty data from the first level to the second level; invalidating the dirty data in the first level; and/or removing the dirty data from the first level.

At 1050, GPU 1002 may adjust, at a beginning of a second observation interval in the set of observation intervals, the first configuration of the cache to a second configuration of the cache. In some aspects, adjusting the first configuration to the second configuration may include: increasing an associativity of the cache and decreasing a number of cache sets of the cache, where a product of the associativity of the cache and the number of cache sets of the cache corresponds to a capacity level of the cache, such that increasing the associativity of the cache and decreasing the number of cache sets of the cache maintains a constant capacity level for the capacity level of the cache. Also, in some aspects, adjusting the first configuration to the second configuration may include: decreasing an associativity of the cache and increasing a number of cache sets of the cache, where a product of the associativity of the cache and the number of cache sets of the cache corresponds to a capacity level of the cache, such that decreasing the associativity of the cache and increasing the number of cache sets of the cache maintains a constant capacity level for the capacity level of the cache. Additionally, the first configuration may include a first organization of an associativity of the cache and the second configuration includes a second organization of the associativity of the cache, where the first organization is different from the second organization, where the associativity of the cache is a manner in which data is stored in the cache. Further, the first configuration may include a first organization of a number of cache sets of the cache and the second configuration includes a second organization of the number of cache sets of the cache, where the first organization is different from the second organization, where the number of cache sets of the cache is a manner in which data is stored in the cache.

At 1060, GPU 1002 may calculate, at an end of the second observation interval, a second average memory latency for the second configuration of the cache.

At 1062, GPU 1002 may transfer dirty data stored in the cache at the second configuration (e.g., from a first level cache to a second level cache). For example, the GPU may flush dirty data stored in the cache for the second configuration from a first level cache to a second level cache.

At 1070, GPU 1002 may adjust, at a beginning of a third observation interval in the set of observation intervals, the second configuration of the cache to a third configuration of the cache. Also, at 1070, GPU 1002 may calculate, at an end of the third observation interval, a third average memory latency for the third configuration of the cache.

At 1080, GPU 1002 may output an indication of a lowest average memory latency of the first average memory latency for the first configuration or the second average memory latency for the second configuration (or a third average memory latency for a third configuration). Outputting the indication of the lowest average memory latency of the first average memory latency or the second average memory latency may include: transmitting, to a graphics processing unit (GPU) or a central processing unit (CPU), the indication of the lowest average memory latency of the first average memory latency or the second average memory latency (e.g., GPU 1002 may transmit indication 1082 to CPU 1004). Also, outputting the indication of the lowest average memory latency of the first average memory latency or the second average memory latency may include: storing, in a system memory or a graphics memory, the indication of the lowest average memory latency of the first average memory latency or the second average memory latency (e.g., GPU 1002 may store indication 1084 in memory 1006). In some aspects, outputting an indication of a lowest average memory latency may include: outputting the indication of the lowest average memory latency of the first average memory latency for the first configuration, the second average memory latency for the second configuration, or a third average memory latency for a third configuration.

At 1090, GPU 1002 may set, based on the lowest average memory latency, the cache to the first configuration or the second configuration for at least one remaining observation interval in the set of observation intervals. Also, at 1090, GPU 1002 may set, based on the lowest average memory latency, the cache to the first configuration, the second configuration, or the third configuration for at least one remaining observation interval in the set of observation intervals.

At 1092, GPU 1002 may monitor, at an end of a last observation interval in the set of observation intervals, the average memory latency for the cache during a first subsequent observation interval in a set of subsequent observation intervals, where the set of subsequent observation intervals is subsequent to the set of observation intervals.

Figure 11:
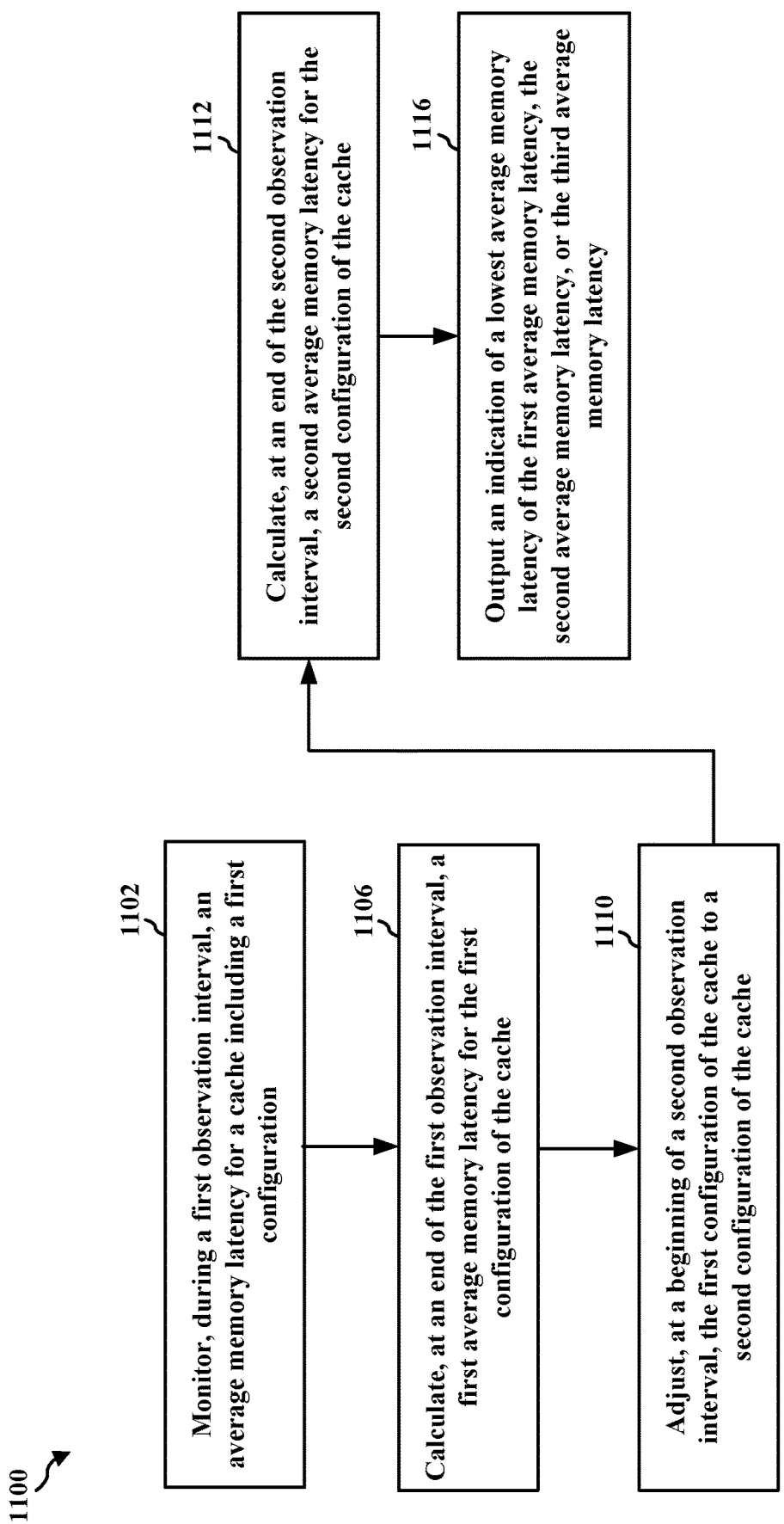
FIG. 11 is a flowchart of an example method of graphics processing.

FIG. 11 is a flowchart 1100 of an example method of display processing in accordance with one or more techniques of this disclosure. The method may be performed by a GPU (e.g., a GPU, a GPU component, another graphics processor, a CPU, a CPU component, or another central processor), a CPU (a CPU, a CPU component, another central processor, a GPU, a GPU component, or another graphics processor), a display driver integrated circuit (DDIC), an apparatus for graphics processing, a wireless communication device, and/or any apparatus that may perform graphics processing as used in connection with the examples of FIGS. 1-10.

At 1102, the GPU may monitor, during a first observation interval in a set of observation intervals, an average memory latency for a cache including a first configuration, as described in connection with the examples in FIGS. 1-10. For example, as described in 1010 of FIG. 10, GPU 1002 may monitor, during a first observation interval in a set of observation intervals, an average memory latency for a cache including a first configuration. Further, step 1102 may be performed by processing unit 120 in FIG. 1. The first configuration may correspond to a first associativity of a capacity level for the cache, and the first associativity may include a number of cache lines that are associated with a cache set for the cache. Also, the average memory latency may correspond to a latency of an average execution time for loading data from the cache, and the cache may be a level 1 (L1) cache, a level 2 (L2) cache, or a level 3 (L3) cache. Further, each of the set of observation intervals may be associated with a number of cache accesses for the cache.

At 1106, the GPU may calculate, at an end of the first observation interval, a first average memory latency for the first configuration of the cache, as described in connection with the examples in FIGS. 1-10. For example, as described in 1030 of FIG. 10, GPU 1002 may calculate, at an end of the first observation interval, a first average memory latency for the first configuration of the cache. Further, step 1106 may be performed by processing unit 120 in FIG. 1.

At 1110, the GPU may adjust, at a beginning of a second observation interval in the set of observation intervals, the first configuration of the cache to a second configuration of the cache, as described in connection with the examples in FIGS. 1-10. For example, as described in 1050 of FIG. 10, GPU 1002 may adjust, at a beginning of a second observation interval in the set of observation intervals, the first configuration of the cache to a second configuration of the cache. Further, step 1110 may be performed by processing unit 120 in FIG. 1. In some aspects, adjusting the first configuration to the second configuration may include: increasing an associativity of the cache and decreasing a number of cache sets of the cache, where a product of the associativity of the cache and the number of cache sets of the cache corresponds to a capacity level of the cache, such that increasing the associativity of the cache and decreasing the number of cache sets of the cache maintains a constant capacity level for the capacity level of the cache. Also, in some aspects, adjusting the first configuration to the second configuration may include: decreasing an associativity of the cache and increasing a number of cache sets of the cache, where a product of the associativity of the cache and the number of cache sets of the cache corresponds to a capacity level of the cache, such that decreasing the associativity of the cache and increasing the number of cache sets of the cache maintains a constant capacity level for the capacity level of the cache. Additionally, the first configuration may include a first organization of an associativity of the cache and the second configuration includes a second organization of the associativity of the cache, where the first organization is different from the second organization, where the associativity of the cache is a manner in which data is stored in the cache. Further, the first configuration may include a first organization of a number of cache sets of the cache and the second configuration includes a second organization of the number of cache sets of the cache, where the first organization is different from the second organization, where the number of cache sets of the cache is a manner in which data is stored in the cache.

At 1112, the GPU may calculate, at an end of the second observation interval, a second average memory latency for the second configuration of the cache, as described in connection with the examples in FIGS. 1-10. For example, as described in 1060 of FIG. 10, GPU 1002 may calculate, at an end of the second observation interval, a second average memory latency for the second configuration of the cache. Further, step 1112 may be performed by processing unit 120 in FIG. 1.

At 1116, the GPU may output an indication of a lowest average memory latency of the first average memory latency for the first configuration or the second average memory latency for the second configuration (or a third average memory latency for a third configuration), as described in connection with the examples in FIGS. 1-10. For example, as described in 1080 of FIG. 10, GPU 1002 may output an indication of a lowest average memory latency of the first average memory latency for the first configuration or the second average memory latency for the second configuration. Further, step 1116 may be performed by processing unit 120 in FIG. 1. Outputting the indication of the lowest average memory latency of the first average memory latency or the second average memory latency may include: transmitting, to a graphics processing unit (GPU) or a central processing unit (CPU), the indication of the lowest average memory latency of the first average memory latency or the second average memory latency. Also, outputting the indication of the lowest average memory latency of the first average memory latency or the second average memory latency may include: storing, in a system memory or a graphics memory, the indication of the lowest average memory latency of the first average memory latency or the second average memory latency. In some aspects, outputting an indication of a lowest average memory latency may include: outputting the indication of the lowest average memory latency of the first average memory latency for the first configuration, the second average memory latency for the second configuration, or a third average memory latency for a third configuration.

Figure 12:
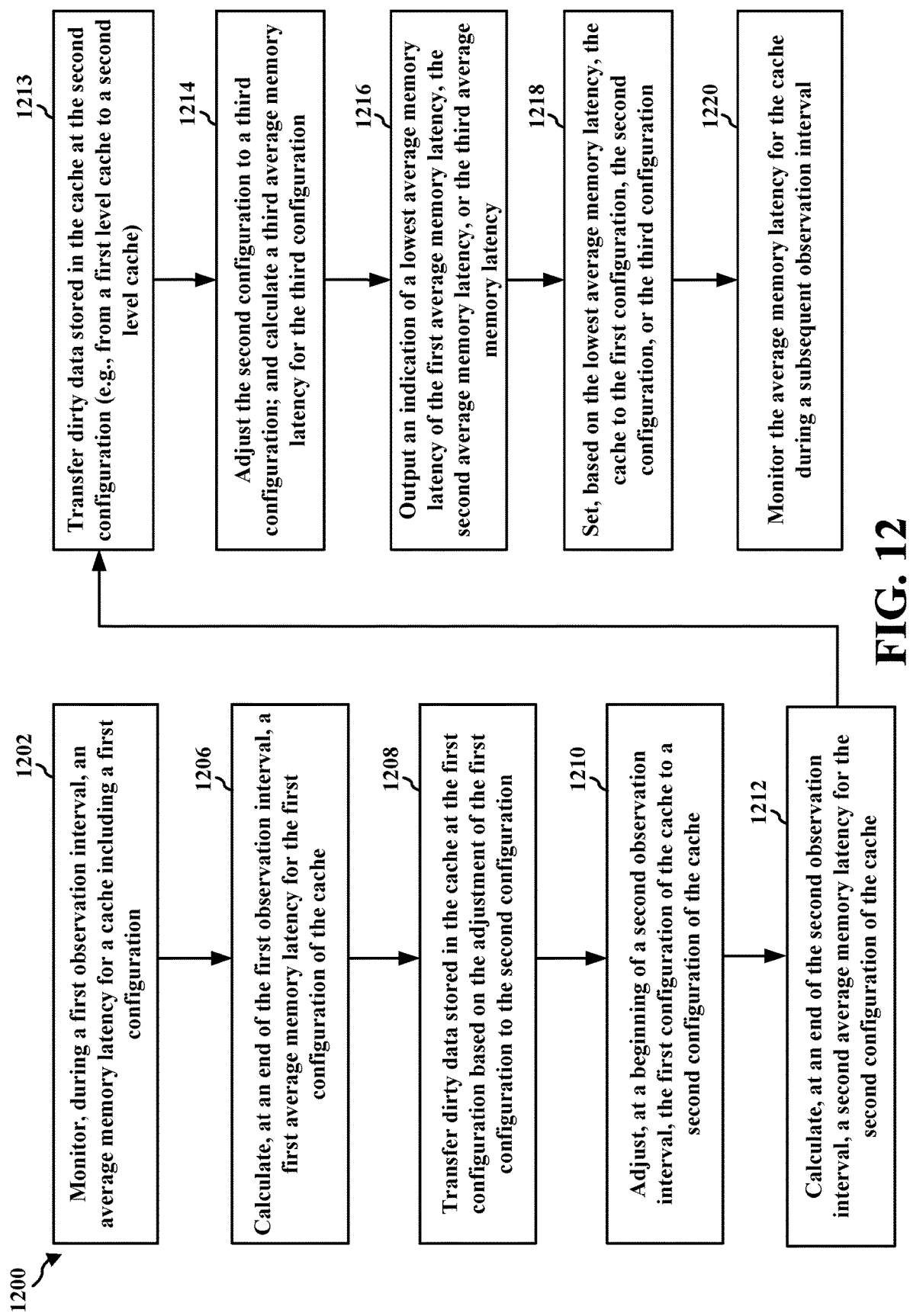
FIG. 12 is a flowchart of an example method of graphics processing.

FIG. 12 is a flowchart 1200 of an example method of display processing in accordance with one or more techniques of this disclosure. The method may be performed by a GPU (e.g., a GPU, a GPU component, another graphics processor, a CPU, a CPU component, or another central processor), a CPU (a CPU, a CPU component, another central processor, a GPU, a GPU component, or another graphics processor), a DDIC, an apparatus for graphics processing, a wireless communication device, and/or any apparatus that may perform graphics processing as used in connection with the examples of FIGS. 1-10.

At 1202, the GPU may monitor, during a first observation interval in a set of observation intervals, an average memory latency for a cache including a first configuration, as described in connection with the examples in FIGS. 1-10. For example, as described in 1010 of FIG. 10, GPU 1002 may monitor, during a first observation interval in a set of observation intervals, an average memory latency for a cache including a first configuration. Further, step 1202 may be performed by processing unit 120 in FIG. 1. The first configuration may correspond to a first associativity of a capacity level for the cache, and the first associativity may include a number of cache lines that are associated with a cache set for the cache. Also, the average memory latency may correspond to a latency of an average execution time for loading data from the cache, and the cache may be a level 1 (L1) cache, a level 2 (L2) cache, or a level 3 (L3) cache. Further, each of the set of observation intervals may be associated with a number of cache accesses for the cache.

Additionally, a length of the first observation interval may be configured to be adjusted based on a workload that is running on a processing device including the cache, as described in connection with the examples in FIGS. 1-10. For example, a length of the first observation interval may be configured to be adjusted based on a workload that is running on a processing device including the cache. In some aspects, the length of the first observation interval may be configured to be adjusted with a driver of the processing device. For instance, a driver may adjust an observation interval once at the beginning of a launch of a workload on a GPU. As the observation interval may be driver configurable, the driver may set an observation interval once at the beginning of a workload. Further, for different workloads, the driver may set different observation intervals. Also, the processing device may be at least one of a graphics processing unit (GPU), a central processing unit (CPU), or a digital signal processor (DSP).

At 1206, the GPU may calculate, at an end of the first observation interval, a first average memory latency for the first configuration of the cache, as described in connection with the examples in FIGS. 1-10. For example, as described in 1030 of FIG. 10, GPU 1002 may calculate, at an end of the first observation interval, a first average memory latency for the first configuration of the cache. Further, step 1206 may be performed by processing unit 120 in FIG. 1.

At 1208, the GPU may transfer dirty data that is stored in the cache at the first configuration based on the adjustment of the first configuration of the cache to the second configuration of the cache, as described in connection with the examples in FIGS. 1-10. For example, as described in 1040 of FIG. 10, GPU 1002 may transfer dirty data that is stored in the cache at the first configuration based on the adjustment of the first configuration of the cache to the second configuration of the cache. Further, step 1208 may be performed by processing unit 120 in FIG. 1. In some aspects, transferring the dirty data that is stored in the cache at the first configuration may include: transferring the dirty data from a first level of the cache to a second level of the cache. Moreover, transferring the dirty data from the first level to the second level may include: writing the dirty data from the first level to the second level; invalidating the dirty data in the first level; and/or removing the dirty data from the first level.

At 1210, the GPU may adjust, at a beginning of a second observation interval in the set of observation intervals, the first configuration of the cache to a second configuration of the cache, as described in connection with the examples in FIGS. 1-10. For example, as described in 1050 of FIG. 10, GPU 1002 may adjust, at a beginning of a second observation interval in the set of observation intervals, the first configuration of the cache to a second configuration of the cache. Further, step 1210 may be performed by processing unit 120 in FIG. 1. In some aspects, adjusting the first configuration to the second configuration may include: increasing an associativity of the cache and decreasing a number of cache sets of the cache, where a product of the associativity of the cache and the number of cache sets of the cache corresponds to a capacity level of the cache, such that increasing the associativity of the cache and decreasing the number of cache sets of the cache maintains a constant capacity level for the capacity level of the cache. Also, in some aspects, adjusting the first configuration to the second configuration may include: decreasing an associativity of the cache and increasing a number of cache sets of the cache, where a product of the associativity of the cache and the number of cache sets of the cache corresponds to a capacity level of the cache, such that decreasing the associativity of the cache and increasing the number of cache sets of the cache maintains a constant capacity level for the capacity level of the cache. Additionally, the first configuration may include a first organization of an associativity of the cache and the second configuration includes a second organization of the associativity of the cache, where the first organization is different from the second organization, where the associativity of the cache is a manner in which data is stored in the cache. Further, the first configuration may include a first organization of a number of cache sets of the cache and the second configuration includes a second organization of the number of cache sets of the cache, where the first organization is different from the second organization, where the number of cache sets of the cache is a manner in which data is stored in the cache.

At 1212, the GPU may calculate, at an end of the second observation interval, a second average memory latency for the second configuration of the cache, as described in connection with the examples in FIGS. 1-10. For example, as described in 1060 of FIG. 10, GPU 1002 may calculate, at an end of the second observation interval, a second average memory latency for the second configuration of the cache. Further, step 1212 may be performed by processing unit 120 in FIG. 1.

At 1213, the GPU may transfer dirty data stored in the cache at the second configuration (e.g., from a first level cache to a second level cache), as described in connection with the examples in FIGS. 1-10. For example, as described in 1062 of FIG. 10, GPU 1002 may transfer dirty data stored in the cache at the second configuration (e.g., from a first level cache to a second level cache). Further, step 1213 may be performed by processing unit 120 in FIG. 1. For example, the GPU may flush dirty data stored in the cache for the second configuration from a first level cache to a second level cache.

At 1214, the GPU may adjust, at a beginning of a third observation interval in the set of observation intervals, the second configuration of the cache to a third configuration of the cache, as described in connection with the examples in FIGS. 1-10. For example, as described in 1070 of FIG. 10, GPU 1002 may adjust, at a beginning of a third observation interval in the set of observation intervals, the second configuration of the cache to a third configuration of the cache. Further, step 1214 may be performed by processing unit 120 in FIG. 1. Also, at 1214, the GPU may calculate, at an end of the third observation interval, a third average memory latency for the third configuration of the cache, as described in connection with the examples in FIGS. 1-10. For example, as described in 1070 of FIG. 10, GPU 1002 may calculate, at an end of the third observation interval, a third average memory latency for the third configuration of the cache. Further, step 1214 may be performed by processing unit 120 in FIG. 1.

At 1216, the GPU may output an indication of a lowest average memory latency of the first average memory latency for the first configuration or the second average memory latency for the second configuration (or a third average memory latency for a third configuration), as described in connection with the examples in FIGS. 1-10. For example, as described in 1080 of FIG. 10, GPU 1002 may output an indication of a lowest average memory latency of the first average memory latency for the first configuration or the second average memory latency for the second configuration. Further, step 1216 may be performed by processing unit 120 in FIG. 1. Outputting the indication of the lowest average memory latency of the first average memory latency or the second average memory latency may include: transmitting, to a graphics processing unit (GPU) or a central processing unit (CPU), the indication of the lowest average memory latency of the first average memory latency or the second average memory latency. Also, outputting the indication of the lowest average memory latency of the first average memory latency or the second average memory latency may include: storing, in a system memory or a graphics memory, the indication of the lowest average memory latency of the first average memory latency or the second average memory latency. In some aspects, outputting an indication of a lowest average memory latency may include: outputting the indication of the lowest average memory latency of the first average memory latency for the first configuration, the second average memory latency for the second configuration, or a third average memory latency for a third configuration.

At 1218, the GPU may set, based on the lowest average memory latency, the cache to the first configuration or the second configuration for at least one remaining observation interval in the set of observation intervals, as described in connection with the examples in FIGS. 1-10. For example, as described in 1090 of FIG. 10, GPU 1002 may set, based on the lowest average memory latency, the cache to the first configuration or the second configuration for at least one remaining observation interval in the set of observation intervals. Further, step 1218 may be performed by processing unit 120 in FIG. 1. Also, at 1218, the GPU may set, based on the lowest average memory latency, the cache to the first configuration, the second configuration, or the third configuration for at least one remaining observation interval in the set of observation intervals, as described in connection with the examples in FIGS. 1-10. For example, as described in 1090 of FIG. 10, GPU 1002 may set, based on the lowest average memory latency, the cache to the first configuration, the second configuration, or the third configuration for at least one remaining observation interval in the set of observation intervals. Further, step 1218 may be performed by processing unit 120 in FIG. 1.

At 1220, the GPU may monitor, at an end of a last observation interval in the set of observation intervals, the average memory latency for the cache during a first subsequent observation interval in a set of subsequent observation intervals, where the set of subsequent observation intervals is subsequent to the set of observation intervals, as described in connection with the examples in FIGS. 1-10. For example, as described in 1092 of FIG. 10, GPU 1002 may monitor, at an end of a last observation interval in the set of observation intervals, the average memory latency for the cache during a first subsequent observation interval in a set of subsequent observation intervals, where the set of subsequent observation intervals is subsequent to the set of observation intervals. Further, step 1220 may be performed by processing unit 120 in FIG. 1.

In configurations, a method or an apparatus for display processing is provided. The apparatus may be a GPU (or other graphics processor), a CPU (or other central processor), a DDIC, an apparatus for graphics processing, and/or some other processor that may perform graphics processing. In aspects, the apparatus may be the processing unit 120 within the device 104, or may be some other hardware within the device 104 or another device. The apparatus, e.g., processing unit 120, may include means for monitoring, during a first observation interval in a set of observation intervals, an average memory latency for a cache including a first configuration. The apparatus, e.g., processing unit 120, may also include means for calculating, at an end of the first observation interval, a first average memory latency for the first configuration of the cache. The apparatus, e.g., processing unit 120, may also include means for adjusting, at a beginning of a second observation interval in the set of observation intervals, the first configuration of the cache to a second configuration of the cache. The apparatus, e.g., processing unit 120, may also include means for calculating, at an end of the second observation interval, a second average memory latency for the second configuration of the cache. The apparatus, e.g., processing unit 120, may also include means for outputting an indication of a lowest average memory latency of the first average memory latency for the first configuration or the second average memory latency for the second configuration. The apparatus, e.g., processing unit 120, may also include means for setting, based on the lowest average memory latency, the cache to the first configuration or the second configuration for at least one remaining observation interval in the set of observation intervals. The apparatus, e.g., processing unit 120, may also include means for adjusting, at a beginning of a third observation interval in the set of observation intervals, the second configuration of the cache to a third configuration of the cache. The apparatus, e.g., processing unit 120, may also include means for calculating, at an end of the third observation interval, a third average memory latency for the third configuration of the cache. The apparatus, e.g., processing unit 120, may also include means for setting, based on the lowest average memory latency, the cache to the first configuration, the second configuration, or the third configuration for at least one remaining observation interval in the set of observation intervals. The apparatus, e.g., processing unit 120, may also include means for monitoring, at an end of a last observation interval in the set of observation intervals, the average memory latency for the cache during a first subsequent observation interval in a set of subsequent observation intervals, where the set of subsequent observation intervals is subsequent to the set of observation intervals. The apparatus, e.g., processing unit 120, may also include means for transferring dirty data that is stored in the cache at the first configuration based on the adjustment of the first configuration of the cache to the second configuration of the cache. The apparatus, e.g., processing unit 120, may also include means for adjusting a length of the first observation interval based on a workload that is running on a processing device including the cache.

The subject matter described herein may be implemented to realize one or more benefits or advantages. For instance, the described graphics processing techniques may be used by a GPU, a CPU, a central processor, or some other processor that may perform graphics processing to implement the reconfigurable cache techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize reconfigurable cache techniques in order to improve memory bandwidth efficiency and/or increase processing speed at a GPU, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only. B only, C only, A and B. A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including a memory and at least one processor coupled to the memory and, based at least in part on information stored in the memory, the at least one processor is configured to: monitor, during a first observation interval in a set of observation intervals, an average memory latency for a cache including a first configuration; calculate, at an end of the first observation interval, a first average memory latency for the first configuration of the cache; adjust, at a beginning of a second observation interval in the set of observation intervals, the first configuration of the cache to a second configuration of the cache; calculate, at an end of the second observation interval, a second average memory latency for the second configuration of the cache; and output an indication of a lowest average memory latency of the first average memory latency for the first configuration or the second average memory latency for the second configuration.

Aspect 2 is the apparatus of aspect 1, where the at least one processor is further configured to: set, based on the lowest average memory latency, the cache to the first configuration or the second configuration for at least one remaining observation interval in the set of observation intervals.

Aspect 3 is the apparatus of any of aspects 1 to 2, where to adjust the first configuration to the second configuration, the at least one processor is configured to: increase an associativity of the cache and decrease a number of cache sets of the cache, and where a product of the associativity of the cache and the number of cache sets of the cache corresponds to a capacity level of the cache, such that an increase in the associativity of the cache and a decrease in the number of cache sets of the cache is configured to maintain a constant capacity level for the capacity level of the cache.

Aspect 4 is the apparatus of any of aspects 1 to 2, where to adjust the first configuration to the second configuration, the at least one processor is configured to: decrease an associativity of the cache and increase a number of cache sets of the cache, and where a product of the associativity of the cache and the number of cache sets of the cache corresponds to a capacity level of the cache, such that a decrease in the associativity of the cache and an increase in the number of cache sets of the cache is configured to maintain a constant capacity level for the capacity level of the cache.

Aspect 5 is the apparatus of any of aspects 1 to 4, where the at least one processor is further configured to: adjust, at a beginning of a third observation interval in the set of observation intervals, the second configuration of the cache to a third configuration of the cache; and calculate, at an end of the third observation interval, a third average memory latency for the third configuration of the cache.

Aspect 6 is the apparatus of aspect 5, where to output the indication of the lowest average memory latency, the at least one processor is configured to: output the indication of the lowest average memory latency of the first average memory latency for the first configuration, the second average memory latency for the second configuration, or the third average memory latency for the third configuration.

Aspect 7 is the apparatus of aspect 6, where the at least one processor is further configured to: set, based on the lowest average memory latency, the cache to the first configuration, the second configuration, or the third configuration for at least one remaining observation interval in the set of observation intervals.

Aspect 8 is the apparatus of any of aspects 1 to 7, where the first configuration includes a first organization of an associativity of the cache and the second configuration includes a second organization of the associativity of the cache, where the first organization is different from the second organization, where the associativity of the cache is a manner in which data is stored in the cache.

Aspect 9 is the apparatus of any of aspects 1 to 8, where the first configuration includes a first organization of a number of cache sets of the cache and the second configuration includes a second organization of the number of cache sets of the cache, where the first organization is different from the second organization, where the number of cache sets of the cache is a manner in which data is stored in the cache.

Aspect 10 is the apparatus of any of aspects 1 to 9, where the at least one processor is further configured to: monitor, at an end of a last observation interval in the set of observation intervals, the average memory latency for the cache during a first subsequent observation interval in a set of subsequent observation intervals, where the set of subsequent observation intervals is subsequent to the set of observation intervals.

Aspect 11 is the apparatus of any of aspects 1 to 10, where transfer dirty data that is stored in the cache at the first configuration based on the adjustment of the first configuration of the cache to the second configuration of the cache.

Aspect 12 is the apparatus of aspect 11, where to transfer the dirty data that is stored in the cache at the first configuration, the at least one processor is configured to: transfer the dirty data from a first level of the cache to a second level of the cache.

Aspect 13 is the apparatus of aspect 12, where to transfer the dirty data from the first level to the second level, the at least one processor is configured to: write the dirty data from the first level to the second level; invalidate the dirty data in the first level; or remove the dirty data from the first level.

Aspect 14 is the apparatus of any of aspects 1 to 13, where a length of an observation interval in the set of observation intervals is configured to adjusted based on a workload that is configured to run on a processing device including the cache.

Aspect 15 is the apparatus of aspect 14, where the length of the observation interval is configured to be adjusted with a driver of the processing device.

Aspect 16 is the apparatus of any of aspects 14 to 15, where the processing device is at least one of a graphics processing unit (GPU), a central processing unit (CPU), or a digital signal processor (DSP).

Aspect 17 is the apparatus of any of aspects 1 to 16, where the first configuration corresponds to a first associativity of a capacity level for the cache, and where the first associativity includes a number of cache lines that are associated with a cache set for the cache.

Aspect 18 is the apparatus of any of aspects 1 to 17, where the average memory latency corresponds to a latency of an average execution time for loading data from the cache, and where the cache is a level 1 (L1) cache, a level 2 (L2) cache, or a level 3 (L3) cache.

Aspect 19 is the apparatus of any of aspects 1 to 18, where each of the set of observation intervals is associated with a number of cache accesses for the cache.

Aspect 20 is the apparatus of any of aspects 1 to 19, where the apparatus is a wireless communication device further including (i.e., comprising): a transceiver coupled to the at least one processor, and where to output the indication of the lowest average memory latency of the first average memory latency or the second average memory latency, the at least one processor is configured to: transmit, to a graphics processing unit (GPU) or a central processing unit (CPU) via the transceiver, the indication of the lowest average memory latency of the first average memory latency or the second average memory latency.

Aspect 21 is the apparatus of any of aspects 1 to 20, where to output the indication of the lowest average memory latency of the first average memory latency or the second average memory latency, the at least one processor is configured to: store, in a system memory or a graphics memory, the indication of the lowest average memory latency of the first average memory latency or the second average memory latency.

Aspect 22 is a method of graphics processing for implementing any of aspects 1 to 21.

Aspect 23 is an apparatus for graphics processing including means for implementing any of aspects 1 to 21.

Aspect 24 is a computer-readable medium (e.g., a non-transitory computer-readable medium) storing computer executable code, the code when executed by at least one processor causes the at least one processor to implement any of aspects 1 to 21.

What is claimed is:

1. An apparatus for graphics processing, comprising:
a memory; and
at least one processor coupled to the memory and, based at least in part on information stored in the memory, the at least one processor is configured to:
monitor, during a first observation interval in a set of observation intervals, an average memory latency for a cache including a first configuration;
calculate, at an end of the first observation interval, a first average memory latency for the first configuration of the cache;
adjust, at a beginning of a second observation interval in the set of observation intervals, the first configuration of the cache to a second configuration of the cache;
calculate, at an end of the second observation interval, a second average memory latency for the second configuration of the cache; and
output an indication of a lowest average memory latency of the first average memory latency for the first configuration or the second average memory latency for the second configuration.

2. The apparatus of claim 1, wherein the at least one processor is further configured to:
set, based on the lowest average memory latency, the cache to the first configuration or the second configuration for at least one remaining observation interval in the set of observation intervals.

3. The apparatus of claim 1, wherein to adjust the first configuration to the second configuration, the at least one processor is configured to: increase an associativity of the cache and decrease a number of cache sets of the cache, and wherein a product of the associativity of the cache and the number of cache sets of the cache corresponds to a capacity level of the cache, such that an increase in the associativity of the cache and a decrease in the number of cache sets of the cache is configured to maintain a constant capacity level for the capacity level of the cache.

4. The apparatus of claim 1, wherein to adjust the first configuration to the second configuration, the at least one processor is configured to: decrease an associativity of the cache and increase a number of cache sets of the cache, and wherein a product of the associativity of the cache and the number of cache sets of the cache corresponds to a capacity level of the cache, such that a decrease in the associativity of the cache and an increase in the number of cache sets of the cache is configured to maintain a constant capacity level for the capacity level of the cache.

5. The apparatus of claim 1, wherein the at least one processor is further configured to:
adjust, at a beginning of a third observation interval in the set of observation intervals, the second configuration of the cache to a third configuration of the cache; and
calculate, at an end of the third observation interval, a third average memory latency for the third configuration of the cache.

6. The apparatus of claim 5, wherein to output the indication of the lowest average memory latency, the at least one processor is configured to: output the indication of the lowest average memory latency of the first average memory latency for the first configuration, the second average memory latency for the second configuration, or the third average memory latency for the third configuration.

7. The apparatus of claim 6, wherein the at least one processor is further configured to:

set, based on the lowest average memory latency, the cache to the first configuration, the second configuration, or the third configuration for at least one remaining observation interval in the set of observation intervals.

8. The apparatus of claim 1, wherein the first configuration includes a first organization of an associativity of the cache and the second configuration includes a second organization of the associativity of the cache, wherein the first organization is different from the second organization, wherein the associativity of the cache is a manner in which data is stored in the cache.

9. The apparatus of claim 1, wherein the first configuration includes a first organization of a number of cache sets of the cache and the second configuration includes a second organization of the number of cache sets of the cache, wherein the first organization is different from the second organization, wherein the number of cache sets of the cache is a manner in which data is stored in the cache.

10. The apparatus of claim 1, wherein the at least one processor is further configured to:
monitor, at an end of a last observation interval in the set of observation intervals, the average memory latency for the cache during a first subsequent observation interval in a set of subsequent observation intervals, wherein the set of subsequent observation intervals is subsequent to the set of observation intervals.

11. The apparatus of claim 1, wherein the at least one processor is further configured to:
transfer dirty data that is stored in the cache at the first configuration based on the adjustment of the first configuration of the cache to the second configuration of the cache.

12. The apparatus of claim 11, wherein to transfer the dirty data that is stored in the cache at the first configuration, the at least one processor is configured to: transfer the dirty data from a first level of the cache to a second level of the cache.

13. The apparatus of claim 12, wherein to transfer the dirty data from the first level to the second level, the at least one processor is configured to:
write the dirty data from the first level to the second level;
invalidate the dirty data in the first level; or
remove the dirty data from the first level.

14. The apparatus of claim 1, wherein a length of an observation interval in the set of observation intervals is configured to be adjusted based on a workload that is configured to run on a processing device including the cache.

15. The apparatus of claim 14, wherein the length of the observation interval is configured to be adjusted with a driver of the processing device.

16. The apparatus of claim 14, wherein the processing device is at least one of a graphics processing unit (GPU), a central processing unit (CPU), or a digital signal processor (DSP).

17. The apparatus of claim 1, wherein the first configuration corresponds to a first associativity of a capacity level for the cache, and wherein the first associativity includes a number of cache lines that are associated with a cache set for the cache.

18. The apparatus of claim 1, wherein the average memory latency corresponds to a latency of an average execution time for loading data from the cache, and wherein the cache is a level 1 (L1) cache, a level 2 (L2) cache, or a level 3 (L3) cache.

19. The apparatus of claim 1, wherein each of the set of observation intervals is associated with a number of cache accesses for the cache.

20. The apparatus of claim 1, wherein the apparatus is a wireless communication device further comprising a transceiver coupled to the at least one processor, and wherein to output the indication of the lowest average memory latency of the first average memory latency or the second average memory latency, the at least one processor is configured to:
transmit, to a graphics processing unit (GPU) or a central processing unit (CPU) via the transceiver, the indication of the lowest average memory latency of the first average memory latency or the second average memory latency.

21. The apparatus of claim 1, wherein to output the indication of the lowest average memory latency of the first average memory latency or the second average memory latency, the at least one processor is configured to: store, in a system memory or a graphics memory, the indication of the lowest average memory latency of the first average memory latency or the second average memory latency.

22. A method of graphics processing, comprising:
monitoring, during a first observation interval in a set of observation intervals, an average memory latency for a cache including a first configuration;
calculating, at an end of the first observation interval, a first average memory latency for the first configuration of the cache;
adjusting, at a beginning of a second observation interval in the set of observation intervals, the first configuration of the cache to a second configuration of the cache;
calculating, at an end of the second observation interval, a second average memory latency for the second configuration of the cache; and
outputting an indication of a lowest average memory latency of the first average memory latency for the first configuration or the second average memory latency for the second configuration.

23. The method of claim 22, further comprising:
setting, based on the lowest average memory latency, the cache to the first configuration or the second configuration for at least one remaining observation interval in the set of observation intervals.

24. The method of claim 22, wherein adjusting the first configuration to the second configuration comprises: increasing an associativity of the cache and decreasing a number of cache sets of the cache, and wherein a product of the associativity of the cache and the number of cache sets of the cache corresponds to a capacity level of the cache, such that increasing the associativity of the cache and decreasing the number of cache sets of the cache maintains a constant capacity level for the capacity level of the cache.

25. The method of claim 22, wherein adjusting the first configuration to the second configuration comprises: decreasing an associativity of the cache and increasing a number of cache sets of the cache, and wherein a product of the associativity of the cache and the number of cache sets of the cache corresponds to a capacity level of the cache, such that decreasing the associativity of the cache and increasing the number of cache sets of the cache maintains a constant capacity level for the capacity level of the cache.

26. The method of claim 22, further comprising:
adjusting, at a beginning of a third observation interval in the set of observation intervals, the second configuration of the cache to a third configuration of the cache;
calculating, at an end of the third observation interval, a third average memory latency for the third configuration of the cache; wherein outputting the indication of the lowest average memory latency comprises: outputting the indication of the lowest average memory latency of the first average memory latency for the first configuration, the second average memory latency for the second configuration, or the third average memory latency for the third configuration; and further comprising:

setting, based on the lowest average memory latency, the cache to the first configuration, the second configuration, or the third configuration for at least one remaining observation interval in the set of observation intervals.

27. The method of claim 22, further comprising:
monitoring, at an end of a last observation interval in the set of observation intervals, the average memory latency for the cache during a first subsequent observation interval in a set of subsequent observation intervals, wherein the set of subsequent observation intervals is subsequent to the set of observation intervals.

28. The method of claim 22, further comprising:
transferring dirty data that is stored in the cache at the first configuration based on the adjustment of the first configuration of the cache to the second configuration of the cache; wherein transferring the dirty data that is stored in the cache at the first configuration comprises: transferring the dirty data from a first level of the cache to a second level of the cache; and wherein transferring the dirty data from the first level to the second level comprises:
writing the dirty data from the first level to the second level;
invalidating the dirty data in the first level; or
removing the dirty data from the first level.

29. An apparatus for graphics processing, comprising:
means for monitoring, during a first observation interval in a set of observation intervals, an average memory latency for a cache including a first configuration;
means for calculating, at an end of the first observation interval, a first average memory latency for the first configuration of the cache;
means for adjusting, at a beginning of a second observation interval in the set of observation intervals, the first configuration of the cache to a second configuration of the cache;
means for calculating, at an end of the second observation interval, a second average memory latency for the second configuration of the cache; and
means for outputting an indication of a lowest average memory latency of the first average memory latency for the first configuration or the second average memory latency for the second configuration.

30. A computer-readable medium storing computer executable code for graphics processing, the code when executed by a processor causes the processor to:
monitor, during a first observation interval in a set of observation intervals, an average memory latency for a cache including a first configuration;
calculate, at an end of the first observation interval, a first average memory latency for the first configuration of the cache;
adjust, at a beginning of a second observation interval in the set of observation intervals, the first configuration of the cache to a second configuration of the cache;
calculate, at an end of the second observation interval, a second average memory latency for the second configuration of the cache; and
output an indication of a lowest average memory latency of the first average memory latency for the first configuration or the second average memory latency for the second configuration.

* * * * *